US012706703B2

(12) United States Patent
Zhang et al.

(10) Patent No.: US 12,706,703 B2
(45) Date of Patent: Aug. 11, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Yi Zhang, Dongguan (CN); Jing Xu, Dongguan (CN); Bin Liang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 277 days.

(21) Appl. No.: 18/241,361

(22) Filed: Sep. 1, 2023

(65) Prior Publication Data

US 2023/0412319 A1 Dec. 21, 2023

Related U.S. Application Data

(63) Continuation of application No. PCT/CN2021/092847, filed on May 10, 2021.

(51) Int. Cl.
*H04L 1/1829* (2023.01)
*H04W 72/1273* (2023.01)
*H04W 72/232* (2023.01)

(52) U.S. Cl.
CPC ....... *H04L 1/1861* (2013.01); *H04W 72/1273* (2013.01); *H04W 72/232* (2023.01)

(58) Field of Classification Search
CPC ... H04W 28/04; H04W 72/04; H04W 72/042; H04W 88/08; H04W 72/232; H04W 72/1273; H04L 5/0007; H04L 1/1861
(Continued)

(56) References Cited

U.S. PATENT DOCUMENTS 10,855,403 B2 12/2020 Medles
11,765,690 B2 * 9/2023 Huang ................ H04B 7/0456 370/329
(Continued)

FOREIGN PATENT DOCUMENTS

CN 106549734 A * 3/2017 ............... H04L 1/16
CN 110383750 A * 10/2019 ........... H04L 1/1812
(Continued)

OTHER PUBLICATIONS

3GPP TSG RAN WG1 #104bis-e, e-Meeting, Apr. 12-Apr. 20, 2021, R1-2103463, Source: Panasonic, Title: Discussion on multi-PDSCH/PUSCH scheduling for NR 52.6-71 GHZ, Agenda Item: 8.2.5. (Year: 2021).*
(Continued)

*Primary Examiner* — Nicholas A Jensen
*Assistant Examiner* — Sanjay K Dewan
(74) *Attorney, Agent, or Firm* — BAYES PLLC

(57) ABSTRACT

Provided in the embodiments of the present application are a wireless communication method, a terminal device and a network device. The method includes: receiving at least one piece of downlink control information (DCI) sent by a network device; and determining or generating a target hybrid automatic repeat request acknowledgement (HARQ-ACK) codebook, where the target HARQ-ACK codebook corresponds to the reception of a physical downlink shared channel (PDSCH) scheduled by the at least one DCI, the release of a semi-persistent scheduling (SPS) PDSCH indicated by the at least one DCI, or the dormancy of a secondary cell (SCell) indicated by the at least one DCI; and the at least one piece of DCI includes a first DCI format and/or a second DCI format, the first DCI format being used for scheduling one PDSCH, and the second DCI format being used for scheduling at least two PDSCHs.

10 Claims, 5 Drawing Sheets

(58) Field of Classification Search
USPC .......................................................... 370/329
See application file for complete search history.

(56) References Cited

U.S. PATENT DOCUMENTS

2012/0218963 A1* 8/2012 Kim ...................... H04L 1/1685 370/329
2016/0029367 A1* 1/2016 Papasakellariou .... H04W 72/23 370/329
2019/0149271 A1* 5/2019 Yin ....................... H04L 1/1607 370/329
2019/0150181 A1* 5/2019 Kim ...................... H04L 1/1896 370/329
2019/0253196 A1 8/2019 Medles
2020/0359401 A1 11/2020 Yoshimura
2022/0140949 A1* 5/2022 Kim ...................... H04L 1/1861 370/329
2022/0140954 A1* 5/2022 Kim ...................... H04L 1/1861 370/329
2023/0139269 A1* 5/2023 MolavianJazi ....... H04L 5/0094 370/329
2023/0199799 A1* 6/2023 Wu ........................... H04L 5/00 370/329
2023/0269034 A1* 8/2023 Karaki .................. H04L 5/0053 370/329
2023/0319843 A1* 10/2023 Lei ........................ H04L 5/0091 370/329
2024/0032031 A1 1/2024 Yi

FOREIGN PATENT DOCUMENTS

CN 110708146 A 1/2020
CN 111670552 A * 9/2020 ........... H04L 1/1854
CN 112398631 A * 2/2021 ........... H04L 1/1812
WO 2020204560 A1 10/2020
WO WO 2020/0204560 A1 * 10/2020 ............... H04L 1/18
WO WO 2022/212387 A1 * 10/2022 ............... H04L 1/18

OTHER PUBLICATIONS

3GPP TSG RAN WG1 #104b-e, e-Meeting, Apr. 12-20, 2021, R1-2103343, Agenda Item: 8.2.5, Source: LG Electronics, Title: PDSCH/PUSCH enhancements to support NR above 52.6 GHZ. (Year: 2021).*
International Search Report in the international application No. PCT/CN2021/092847, mailed on Jan. 29, 2022. 5 pages with English translation.
Written Opinion of the International Search Authority in the international application No. PCT/CN2021/092847, mailed on Jan. 29, 2022. 8 pages with English translation.
3GPP TSG RAN WG1 #104-e R1-2100187, e-Meeting, Jan. 25-Feb. 5, 2021, Source: OPPO, Title: Discussion on multi-cell PDSCH scheduling via a single DCI, Agenda Item: 8.13.2, Document for: Discussion and Decision. the whole document. 9 pages.
Panasonic: "Discussion on multi-PDSCH/PUSCH scheduling for NR52.6-71 GHz", 3GPP Draft; R1-2103463, 3rd Generation Partnership Projectt (3GPP), Mobile Competence Centre ; 650, Route Des LUcIOLEs ; E-06921 Sophia-Antipolis Cedex; France vol. RAN WG1, No. e-Meeting; Arp. 12, 2021-Apr. 2, 2021, Apr. 6, 2021 (Apr. 4, 2021), XP051993419, p. 4, 5 pages.
LG Electronics: "PDSCH/PUSCH enhancements to support NR above 52.6 GEz", 3GPP Draft; R1-2103343, 3rd Generation Partnership Project (3GPP), Mbilecompetence Centre ; 650, Route Des LUcIOLES ; F-06921 Sophia-Antipolis Cedex; France vol. RAN WC1, No. e-Meeting; Apr. 12, 2021-Apr. 2, 2021, Apr. 7, 2021 (Apr. 7, 2021), XP052178098, pp. 6-9, 22 pages.
Supplementary European Search Report in the European application No. 21941181.6, mailed on Mar. 14, 2024, 12 pages.
First Office Action of the Chinese application No. 202180095169.8, issued on May 9, 2026.

* cited by examiner

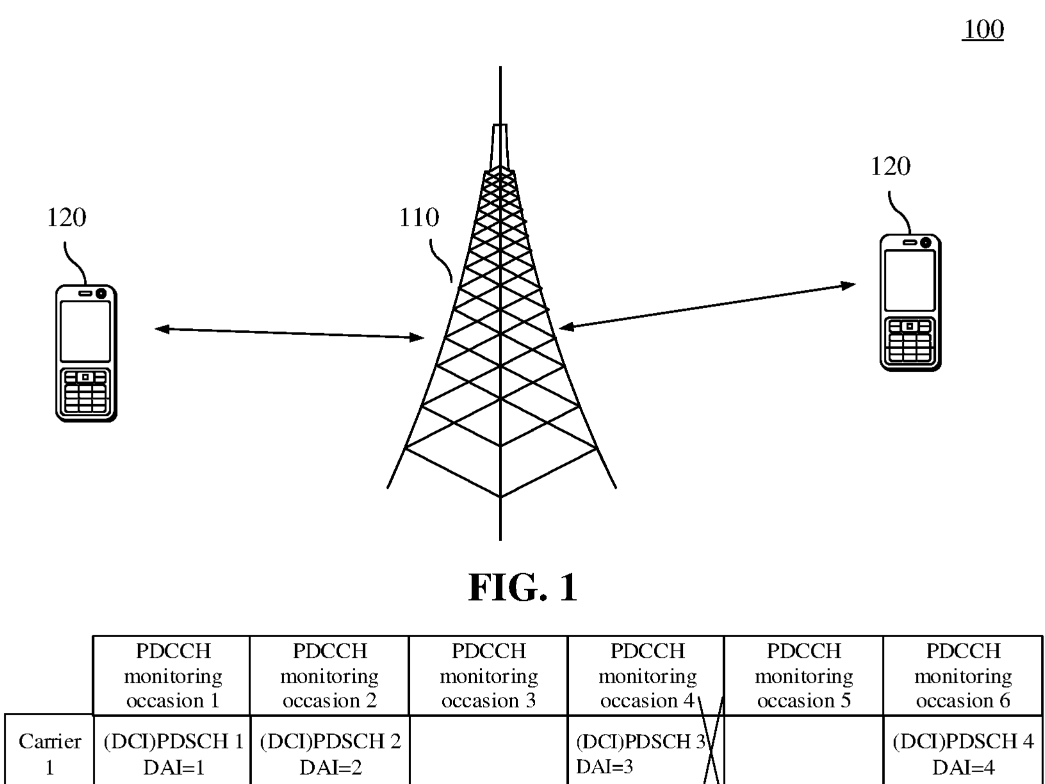

FIG. 1

| | PDCCH monitoring occasion 1 | PDCCH monitoring occasion 2 | PDCCH monitoring occasion 3 | PDCCH monitoring occasion 4 | PDCCH monitoring occasion 5 | PDCCH monitoring occasion 6 |
|---|---|---|---|---|---|---|
| Carrier 1 | (DCI)PDSCH 1 DAI=1 | (DCI)PDSCH 2 DAI=2 | | (DCI)PDSCH 3 DAI=3 | | (DCI)PDSCH 4 DAI=4 |

Terminal device

Network device

S210, At least one DCI is received from the network device

S220, A target HARQ-ACK codebook is determined or generated, where the target HARQ-ACK codebook corresponds to a PDSCH reception scheduled by the at least one DCI, an SPS PDSCH release indicated by the at least one DCI, or an SCell dormancy indicated by the at least one DCI

FIG. 3

| | PDCCH monitoring occasion 1 | PDCCH monitoring occasion 2 | PDCCH monitoring occasion 3 |
|---|---|---|---|
| Carrier 1 | DCI format b (C-DAI=2, T-DAI=2) | DCI format b (C-DAI=4, T-DAI=4) | DCI format b (C-DAI=2,T-DAI=2) |
| Carrier 2 | | | |

FIG. 4

| | PDCCH monitoring occasion 1 | PDCCH monitoring occasion 2 | PDCCH monitoring occasion 3 |
|---|---|---|---|
| Carrier 1 | DCI format b (C-DAI=1, T-DAI=1) | DCI format b (C-DAI=2, T-DAI=2) | DCI format b (C-DAI=3,T-DAI=3) |
| Carrier 2 | | | |

FIG. 5

| PDSCH 1 DAI=1 | PDSCH 2 DAI=2 | | PDSCH 3 DAI=3 | | PDSCH 4 DAI=4 |
|---|---|---|---|---|---|

FIG. 6

| PDSCH 1 DAI=1 | PDSCH 2 DAI=2 | | PDSCH 3+ PDSCH 4 DAI=3 | | PDSCH 5 DAI=4 |
|---|---|---|---|---|---|

FIG. 7

| | PDCCH monitoring occasion 1 | PDCCH monitoring occasion 2 | PDCCH monitoring occasion 3 | PDCCH monitoring occasion 4 |
|---|---|---|---|---|
| Carrier 1 (First DCI format) | First DCI 1: {C-DAI=1, T-DAI=2} | First DCI 3: {C-DAI=3, T-DAI=3} | First DCI 4: {C-DAI=4, T-DAI=4} | First DCI 5: {C-DAI=1, T-DAI=2} |
| Carrier 2 (first DCI format and second DCI format) | First DCI 2: {C-DAI=2, T-DAI=2}; Second DCI1: {C-DAI=1, T-DAI=2} | Second DCI 3: {C-DAI=3, T-DAI=3} | | First DCI 6: {C-DAI=2, T-DAI=2} |
| Carrier 3 (Second DCI format) | Second DCI 2: {C-DAI=2, T-DAI=2} | | Second DCI 4: {C-DAI=4, T-DAI=4} | Second DCI 5: {C-DAI=1, T-DAI=1} |

FIG. 8

| Third HARQ-ACK sub-codebook | Fourth HARQ-ACK sub-codebook | Fifth HARQ-ACK sub-codebook | Sixth HARQ-ACK sub-codebook |
|---|---|---|---|

FIG. 9

| Third HARQ-ACK sub-codebook | Fifth HARQ-ACK sub-codebook | Fourth HARQ-ACK sub-codebook | Sixth HARQ-ACK sub-codebook |
|---|---|---|---|

FIG. 10

| | PDCCH monitoring occasion 1 | PDCCH monitoring occasion 2 | PDCCH monitoring occasion 3 | PDCCH monitoring occasion 4 |
|---|---|---|---|---|
| Carrier 1 (First DCI format) | First DCI 1-1: {C-DAI=1, T-DAI=1} | First DCI 1-2: {C-DAI=2, T-DAI=2} | First DCI 1-3: {C-DAI=3, T-DAI=3} | First DCI 1-4: {C-DAI=4, T-DAI=4} |
| Carrier 2 (first DCI format and second DCI format) | First DCI 2-1: {C-DAI=1, T-DAI=1} Second DCI 3-1: {C-DAI=1, T-DAI=1} | Second DCI 3-2: {C-DAI=2, T-DAI=2} | | First DCI 2-2: {C-DAI=2, T-DAI=2} |
| Carrier 3 (Second DCI format) | Second DCI 4-1: {C-DAI=1, T-DAI=1} | | Second DCI 4-2: {C-DAI=2, T-DAI=2} | Second DCI 4-3: {C-DAI=3, T-DAI=3} |

FIG. 11

WIRELESS COMMUNICATION METHOD, TERMINAL DEVICE AND NETWORK DEVICE

CROSS-REFERENCE TO RELATED APPLICATION

This application is a continuation of International Application No. PCT/CN2021/092847 filed on May 10, 2021, the disclosure of which is hereby incorporated by reference in its entirety.

BACKGROUND

Release 17 (Rel-17) supports dynamic spectrum sharing (DSS) between a long term evolution (LTE) system and a new radio (NR) system. For carriers coexisting between the LTE system and the NR system, in order to avoid an interference of the NR system to the LTE system, the NR system cannot use control resource set (CORESET) of the LTE system and physical downlink control channel (PDCCH) resources of the LTE system. Therefore, a capacity of NR PDCCH on the coexisting carriers will be affected.

Therefore, it is urgent to improve a manner of scheduling the PDSCH in this field to improve system performance.

SUMMARY

Embodiments of the present disclosure relate to the field of communication, and more particularly to a method for wireless communication, a terminal device and a network device.

In a first aspect, the present disclosure provides a method for wireless communication including the following two operations.

At least one downlink control information (DCI) is received from a network device.

A target hybrid automatic repeat request acknowledgement (HARQ-ACK) codebook is determined or generated, where the target HARQ-ACK codebook corresponds to a physical downlink shared channel (PDSCH) reception scheduled by the at least one DCI, a semi-persistent scheduling (SPS) PDSCH release indicated by the at least one DCI or a secondary cell (SCell) dormancy indicated by the at least one DCI.

The at least one DCI includes at least one of a first DCI format for scheduling one PDSCH, or a second DCI format for scheduling at least two PDSCHs.

In a second aspect, the present disclosure provides a terminal device including a processor, a transceiver and a memory for storing computer-executable instructions, the processor is configured to invoke and run the computer-executable instructions stored in the memory, to perform operations of: receiving, through the transceiver, at least one downlink control information (DCI) from a network device; and determining or generating a target hybrid automatic repeat request acknowledgement (HARQ-ACK) codebook. The target HARQ-ACK codebook corresponds to a physical downlink shared channel (PDSCH) reception scheduled by the at least one DCI, a semi-persistent scheduling (SPS) PDSCH release indicated by the at least one DCI, or a secondary cell (SCell) dormancy indicated by the at least one DCI.

The at least one DCI includes at least one of a first DCI format for scheduling one PDSCH, or a second DCI format for scheduling at least two PDSCHs.

In a third aspect, the present disclosure provides a network device including a processor, a transceiver and a memory for storing computer-executable instructions, the processor is configured to invoke and run the computer-executable instructions stored in the memory, to perform operations of: sending, through the transceiver, at least one downlink control information (DCI) to a terminal device; and determining or generating a target hybrid automatic repeat request acknowledgement (HARQ-ACK) codebook. The target HARQ-ACK codebook corresponds to a physical downlink shared channel (PDSCH) reception scheduled by the at least one DCI, a semi-persistent scheduling (SPS) PDSCH release indicated by the at least one DCI, or a secondary cell (SCell) dormancy indicated by the at least one DCI.

The at least one DCI includes at least one of a first DCI format for scheduling one PDSCH, or a second DCI format for scheduling at least two PDSCHs.

BRIEF DESCRIPTION OF THE DRAWINGS

FIG. 1 is an example of a communication system architecture applied by embodiments of the present disclosure.

FIG. 2 is an example of determining a DAI in a manner of accumulating the number of PDSCH receptions according to an embodiment of the present disclosure.

FIG. 3 is a schematic flowchart of a method for wireless communication according to an embodiment of the present disclosure.

FIG. 4 is an example of determining a counter-downlink assignment index (C-DAI) and a total-downlink assignment index (T-DAI) by accumulating the number of PDSCH receptions according to an embodiment of the present disclosure.

FIG. 5 is an example of determining a C-DAI and a T-DAI by accumulating the number of DCIs for scheduling PDSCH reception according to an embodiment of the present disclosure.

FIG. 6 and FIG. 7 are examples of a DAI (e.g., C-DAI or T-DAI) of the first HARQ-ACK sub-codebook and a DAI (e.g., C-DAI or T-DAI) of the second HARQ-ACK sub-codebook are uniformly counted according to an embodiment of the present disclosure.

FIG. 8 is an example of a target HARQ-ACK codebook in a case where neither a first parameter nor a second parameter is configured for a terminal device according to an embodiment of the present disclosure.

FIG. 9 and FIG. 10 are examples of an order of multiple sub-codebooks included in the target HARQ-ACK codebook according to an embodiment of the present disclosure.

FIG. 11 is an example of a target HARQ-ACK codebook in a case where the terminal device is configured with a first parameter having a value of 4 and not configured with a second parameter according to an embodiment of the present disclosure.

DETAILED DESCRIPTION

Figure 12:
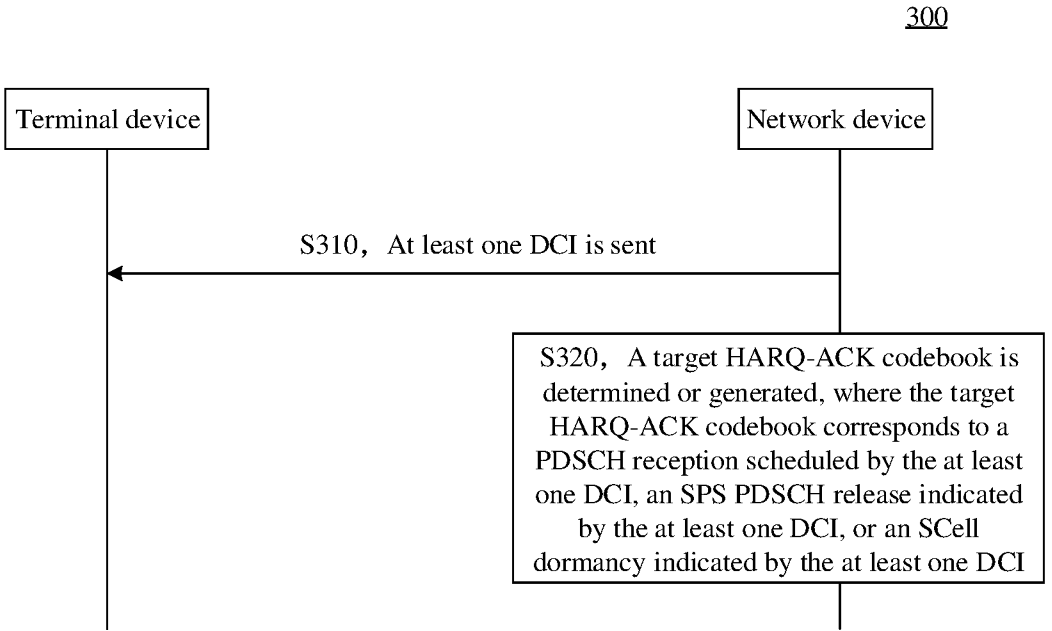
FIG. 12 is another schematic flowchart of a method for wireless communication according to an embodiment of the present disclosure.

The technical scheme in the embodiments of the disclosure will be described below in conjunction with the drawings in the embodiments of the application. It is apparent that the described embodiments are a part of the embodiments of the application, not all of the embodiments. Based on the embodiments in the application, all other embodiments obtained by those skilled in the art without creative effort belong to the protection scope of the application.

The technical scheme in the embodiments of the present disclosure can be applied to various communication systems, such as: a global system of mobile communication (GSM) system, a code division multiple access (CDMA) system, a wideband code division multiple access (WCDMA) system, a general packet radio service (GPRS), a long term evolution (LTE) system, an advanced long term evolution (LTE) system, a new radio (NR) system, an evolution system for NR system, a LTE-based access to unlicensed spectrum (LTE-U) system, a NR-based access to unlicensed spectrum (NR-U) system, a non-terrestrial networks (NTN) system, a universal mobile telecommunications system (UMTS), a wireless local area network (WLAN), a wireless fidelity (Wi-Fi), a 5th-generation (5G) system or other communication systems.

Generally speaking, traditional communication systems support a limited number of connections and are easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, or vehicle to everything (V2X) communication, etc. Embodiments of the present disclosure can also be applied to these communication systems.

Optionally, the communication system in the embodiments of the present disclosure can be applied to a carrier aggregation (CA) scenario, a dual connectivity (DC) scenario, and a standalone (SA) network distribution scenario.

Optionally, in some embodiments, the communication system in the embodiments of the present disclosure may be applied to an unlicensed spectrum, and the unlicensed spectrum may also be considered as a shared spectrum. Optionally, the communication system in the embodiments of the present disclosure may also be applied to a licensed spectrum, and the licensed spectrum may also be considered as a non-shared spectrum.

The embodiments of the present disclosure are described in connection with a network device and a terminal device. The terminal device may also be referred to as user equipment (UE), an access terminal, a user unit, a user station, a mobile station, a remote terminal, a mobile device, a user terminal, a terminal, a wireless communication device, a user agent or a user device, etc.

The terminal device may be a station (ST) in the WLAN, a cellular telephone, a cordless telephone, a session initiation protocol (SIP) telephone, a wireless local loop (WLL) station, a personal digital assistant (PDA) device, a handheld device having a wireless communication function, a computing device or other processing device connected to a wireless modem, a vehicle-mounted device, a wearable device, a terminal device in a next generation communication system such as an NR network, or a terminal device in a future evolved public land mobile network (PLMN) network, etc.

In the embodiments of the present disclosure, the terminal device may be deployed on land, and include indoor or outdoor device, hand-held device, wearable device or vehicle-mounted device. The terminal device can also be deployed on the water (such as on the ships, etc.). The terminal device can also be deployed in the air (such as, in airplanes, in balloons and in satellites, etc.).

In the embodiments of the present disclosure, the terminal device may be a mobile phone, a Pad, a computer with wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, etc.

By way of example and not limitation, in the embodiments of the present disclosure, the terminal device may also be a wearable device. The wearable device can also be referred to as a wearable smart device, which is a general term of wearable devices that are intelligently designed and developed by applying wearable technology to daily wear, such as, glasses, gloves, watches, clothing and shoes. The wearable device is a portable device that is worn directly on the body or integrated into the user's clothes or accessories. The wearable device is not only a kind of hardware device, but also realizes powerful functions through software support, data interaction and cloud interaction. The generalized wearable smart device has full functions and a large size, and the generalized wearable smart device can realize complete or partial functions without relying on smart phones, such as smart watches or smart glasses, and the generalized wearable smart device only focus on certain application functions and need to be used in conjunction with other devices (such as, smart phones), such as, various smart bracelets and smart jewelry for monitoring physical signs.

In the embodiments of the present disclosure, the network device may be a device configured to communicate with a mobile device, and the network device may be an access point (AP) in a WLAN, a base transceiver station (BTS) in a GSM or CDMA, a NodeB (NB) in a WCDMA, an evolved Node B (eNB or eNodeB) in an LTE, a relay station or an access point, a vehicle-mounted device, a wearable device, a network device or a gNB in an NR network, a network device in a future evolved PLMN network or a network device in an NTN network, etc.

By way of example and not limitation, in the embodiments of the present disclosure, the network device may have mobility characteristics, for example, the network device may be a mobile device. Optionally, the network device may be a satellite, a balloon station. For example, the satellite may be a low earth orbit (LEO) satellite, a medium earth orbit (MEO) satellite, a geostationary earth orbit (GEO) satellite, a high elliptical orbit (HEO) satellite, and the like. Optionally, the network device may also be a base station located on land, water, etc.

In the embodiments of the present disclosure, the network device can provide a service for a cell, and the terminal device communicates with the network device through transmission resources (e.g., frequency resources, or spectrum resources) used by the cell. The cell may be a cell corresponding to the network device (e.g., base station), and the cell may belong to a macro base station or a base station corresponding to a small cell. The small cell can include a metro cell, a micro cell, a Pico cell, a Femto cell, etc. These small cells have characteristics of small coverage and low transmission power, and the small cells are suitable for providing a high-speed data transmission service.

Exemplarily, the communication system 100 to which the embodiments of the present disclosure are applied is illustrated in FIG. 1. The communication system 100 may include a network device 110. The network device 110 may be a device that communicates with a terminal device 120 (which also referred to as a communication terminal or terminal). The network device 110 may provide communication coverage for a particular geographic area and may communicate with terminal devices located within the coverage.

FIG. 1 exemplarily illustrates one network device and two terminal devices. Optionally, the communication system 100 may include multiple network devices, and other numbers of terminal devices may be included within the coverage of each network device, which is not limited by the embodiments of the present disclosure.

Optionally, the communication system 100 may also include other network entities, such as, network controllers, mobility management entities, etc., which are not limited by the embodiments of the present disclosure.

It should be understood that a device having a communication function in the network or system in the embodiments of the present disclosure may be referred to as a communication device. The communication system 100 illustrated in FIG. 1 is taken as an example, the communication device may include a network device 110 and a terminal device 120 that both have the communication function, and the network device 110 and the terminal device 120 may be specific devices described above, which will not be described herein. The communication device may also include other devices in the communication system 100, such as, network controllers, mobility management entities and other network entities, which are not limited in the embodiments of the present disclosure.

It should be understood that the terms "system" and "network" are often used interchangeably herein. In the present disclosure, the term "and/or" is only an association relationship describing associated objects and represents that three relationships may exist. For example, A and/or B may represent three conditions: i.e., independent existence of A, existence of both A and B and independent existence of B. In addition, the character "/" in the disclosure generally indicates that the relationship between the related objects is "or".

Terms used in the embodiments of the present disclosure are used only for explanation of specific embodiments of the present disclosure and the terms are not intended to limit the present disclosure. The terms "first", "second" and the like in the description and claims of the present disclosure and the accompanying drawings are used to distinguish different objects and are not used to describe a particular sequence. Furthermore, the terms "including" and "having" and any variations thereof are intended to cover non-exclusive inclusion.

It should be understood that the reference to "indication" in the embodiments of the present disclosure may be a direct indication, may be an indirect indication, or may be indicative of an association. For example, A indicates B, which can mean that A directly indicates B, for example, B can be obtained through A; it can also mean that A indirectly indicates B, for example, A indicates C, and B can be obtained by C; and it can also indicate that there is an association between A and B.

In the description of the embodiments of the present disclosure, the term "correspondence" may mean that there is a direct correspondence or an indirect correspondence between the two, may also mean that there is an association relationship between the two, and may also be a relationship between indication and being indicated, configuration and being configured, etc.

Two types of HARQ-ACK codebooks are supported in NR Rel-15 system, which are the Type-1 HARQ-ACK codebook and the Type-2 HARQ-ACK codebook.

The Type-2 HARQ-ACK codebook is described below for ease of understanding of the present disclosure.

The Type-2 HARQ-ACK codebook determines the number of bits of a HARQ-ACK codebook in a dynamic manner, i.e., the terminal device determines, according to the received DCI, the number of bits of the HARQ-ACK feedback required by the actual scheduled PDSCH, SPS PDSCH release indication and SCell dormancy indication.

In particular, in order to solve the problem of missing detection of remaining PDCCHs, other than the last PDCCH, a downlink assignment index (DAI) indication is introduced. FIG. 2 is an example of determining a DAI in a manner of accumulating the number of the PDSCH receptions according to an embodiment of the present disclosure. It is assumed that the base station sends a TB-based transmission of PDSCH on a single carrier, and each DCI can only schedule one code word. As shown in FIG. 2, the base station sends PDSCH 1 to PDSCH 4 on carrier 1, and the PDSCH 1 to PDSCH 4 correspond to DAI=1 to 4, respectively. The terminal device fails to receive PDSCH 3 due to the missing detection of PDCCH for scheduling the PDSCH 3, but the terminal device receives PDSCH 4 and the DAI=4 corresponds to the PDSCH 4, then the terminal device can determine the missing detection of the PDSCH 3, and feedback 4-bit HARQ-ACK to the base station.

In a multi-carrier scenario, the DAI includes a counter-DAI (C-DAI) and a total DAI (T-DAI).

The C-DAI represents the accumulative number of PDSCH receptions, the SPS PDSCH release indication or the SCell dormancy indication associated with the DCI format up to a current serving cell and a current PDCCH monitoring occasion (a value of the counter downlink assignment indicator (DAI) field in DCI formats denotes the accumulative number of {serving cell, PDCCH monitoring occasion}-pair(s) in which the PDSCH reception(s), the SPS PDSCH release or the SCell dormancy indication associated with the DCI formats is present up to the current serving cell and current PDCCH monitoring occasion).

The T-DAI represents the accumulative number of the PDSCH receptions, the SPS PDSCH release indications or the SCell dormancy indications associated with the DCI format, in a current PDCCH monitoring occasion on all serving cells (The value of the total DAI, when present [5, TS 38.212], in a DCI format denotes the total number of {serving cell, PDCCH monitoring occasion}-pair(s) in which the PDSCH reception(s), the SPS PDSCH release or the SCell dormancy indication associated with DCI formats is present, up to the current PDCCH monitoring occasion m and is updated from PDCCH monitoring occasion to PDCCH monitoring occasion).

Taking DCI containing 2-bit C-DAI and 2-bit T-DAI as an example, a construction process of the type-2 HARQ-ACK codebook is as follows.

All PDCCH monitoring occasions are traversed from small to large, indexes of all serving cells are traversed from small to large; the first temporary value is initialized to be 0; and j is initialized to be 0. The j represents the number of times that the C-DAI reaches the maximum value (the C-DAI counts in cyclic, i.e., 1, 2, 3, 4, 1, 2, 3, 4, 1, 2, . . . , where the first 1 represents 1, and the second 1 actually represents 5). If there is a PDSCH or a PDCCH indicating the SPS PDSCH release or indicating the SCell dormancy on the serving cell c at a PDCCH monitoring occasion m, then the size relationship between the value of the C-DAI and the first temporary value is determined. If the value of the C-DAI is less than or equal to the first temporary value, then j+1; otherwise, the first temporary value is updated with the value of the C-DAI. If the terminal device is configured to receive only one TB on all carriers, a HARQ-ACK bit of this cell is filled on the bit of 4*j+C-DAI-1. If the terminal device is configured to receive two TBs on least one carrier, and the terminal device is configured with a HARQ-ACK-Spatial-BundlingPUCCH, a value obtained by performing logic AND on the HARQ-ACKs of the two TBs of the cell is filled on the bit of 4*j+C-DAI-1. If the terminal device is configured to receive two TBs on at least one carrier and is not configured with HARQ-ACK-SpatialBundlingPUCCH, the HARQ-ACK bit information of the first TB of the cell is filled on the bit of 4*j+2*(C-DAI-1), and the HARQ-ACK bit information of the second TB of the cell is filled on the bit of 4*j+2*(C-DAI-1)+1. The total number of HARQ-ACK bits is determined and denoted as $O^{ack}$. During the implementation process above, if some of bits are not filled with corresponding HARQ-ACK information, NACK is filled on these bits.

In addition, the NR also supports a code block group (CBG)-based transmission. For a CBG-based downlink reception, the terminal device allocates all the code blocks (CB) contained in a transport block (TB) to S CBGs according to the principle of being as average as possible, where S represents the number of CBGs contained in each TB. S is determined by: S=min (K, C), where K is the maximum number of CBGs of each TB configured by the base station, and C is the number of CBs included in the TB.

If the terminal device configures a CBG-based transmission on a downlink cell set $$N_{cells}^{DL,CBG},$$

and does not configure a CBG-based transmission on another downlink cell set $$N_{cells}^{DL,TB},$$

the terminal device may determine the HARQ-ACK codebook according to the following rules or manners.

The terminal device generates two HARQ-ACK sub-codebooks. One HARQ-ACK sub-codebook of the two HARQ-ACK sub-codebooks includes HARQ-ACK bits respectively corresponding to the SPS PDSCH release, the SPS PDSCH reception, the Scell dormancy indication, the TB-based PDSCH transmission on the cells in the $$N_{cells}^{DL,CBG}$$

and $$N_{cells}^{DL,TB}.$$

The other HARQ-ACK sub-codebook includes HARQ-ACK bits corresponding to CBG-based transmission on the cell in the $$N_{cells}^{DL,CBG}.$$

Then, the terminal device appends the two HARQ-ACK sub-codebooks together, for example, the terminal device appends the one HARQ-ACK sub-codebook behind the other HARQ-ACK sub-codebook to form a final HARQ-ACK codebook.

The Rel-17 supports DSS for the LTE system and the NR system. For carriers where the LTE system and the NR system coexist, in order to avoid an interference of the NR system to the LTE system, the NR system cannot use CORESET of the LTE system and PDCCH resources of the LTE system. Therefore, a capacity of NR PDCCH will be affected on the coexisting carriers.

In view of the above problems, the present disclosure provides a technical solution that a DCI is designed to schedule PDSCHs of at least two different carriers. For example, a DCI on a primary cell (PCell) or SCell can schedule PDSCHs on PCell and SCell. Based on this, whether the HARQ-ACKs corresponding to PDSCHs on at least two carriers are transmitted in the same PUCCH resource and how to transmit the HARQ-ACKs are further problems that need to be improved. For the convenience of describing the scheme of the present disclosure, the DCI for scheduling a PDSCH of one carrier is represented as a first DCI format, and the DCI for scheduling PDSCHs of at least two carriers is represented as a second DCI format.

FIG. 3 is a schematic flowchart of a method 200 for wireless communication according to an embodiment of the present disclosure. The method 200 may be interactively performed by a terminal device and a network device. The terminal device shown in FIG. 3 may be the terminal device shown in FIG. 1 and the network device shown in FIG. 3 may be the access network device shown in FIG. 1.

As shown in FIG. 3, the method 200 may include some or all of operations S210 and S220.

In operation S210, at least one DCI is received from a network device.

In operation S220, a target HARQ-ACK codebook is determined or generated, where the target HARQ-ACK codebook corresponds to a PDSCH reception scheduled by the at least one DCI, an SPS PDSCH release indicated by the at least one DCI, or an SCell dormancy indicated by the at least one DCI.

The at least one DCI includes at least one of a first DCI format for scheduling one PDSCH, or a second DCI format for scheduling at least two PDSCHs. Optionally, the HARQ-ACKs of at least two PDSCHs scheduled by the second DCI format is transmitted at the same PUCCH resource.

As an example, the HARQ-ACK bits are determined or generated correspondingly for PDSCH reception scheduled by each of the at least one DCI, SPS PDSCH release indicated by each of the at least one DCI, or SCell dormancy indicated by each of the at least one DCI, the HARQ-ACK bits may compose the target HARQ-ACK codebook.

Based on the technical scheme, the second DCI format is designed to schedule at least two PDSCHs, which improves the manner of scheduling the PDSCHs and is capable of improving the system performance. In particular, for the carriers where the LTE system and the NR system coexist, at least two PDSCHs are scheduled by the second DCI format, so that interference generated by NR to LTE system can be avoided, and even if the CORESET of LTE and the PDCCH resources of LTE cannot be used for the NR transmission, it is able to ensure that the terminal device provides the HARQ-ACK feedback associated with the PDSCH, thereby ensuring the communication quality.

It should be noted that the specific type of the first DCI format is not limited in the embodiments of the present disclosure. For example, the first DCI format includes, but is not limited to, DCI format 1_0, DCI format 1_1, or DCI format 1_2.

In some embodiments, each of the at least one DCI includes a C-DAI, and a value of the C-DAI indicates an accumulative number of DCIs for scheduling the PDSCH reception, indicating the SPS PDSCH release or indicating the SCell dormancy up to a current serving cell and a current PDCCH monitoring occasion. For example, each (or one) of the at least one DCI includes a C-DAI, the value of the C-DAI indicates an accumulative number of DCIs for scheduling the PDSCH reception, indicating the SPS PDSCH release or indicating the SCell dormancy up to current serving cell and a current PDCCH monitoring occasion. For example, in the absence of an SPS PDSCH release indication and an SCell dormancy indication, the value of the C-DAI indicates an accumulative number of DCIs for scheduling the PDSCH reception up to a current serving cell and a current PDCCH monitoring occasion.

In other words, the C-DAI is redefined in this disclosure, i.e., the C-DAI is determined by accumulating the number of DCIs.

In some embodiments, each of the at least one DCI includes a T-DAI, and a value of the T-DAI indicates an accumulative number of DCIs for scheduling the PDSCH reception, indicating the SPS PDSCH release or indicating the SCell dormancy, up to a current PDCCH monitoring occasion on all serving cells. For example, each (or one) of the at least one DCI includes a T-DAI, the value of the T-DAI indicates an accumulative number of DCIs for scheduling the PDSCH reception, indicating the SPS PDSCH release or indicating the SCell dormancy, up to a current PDCCH monitoring occasion on all serving cells. For example, in the absence of an SPS PDSCH release indication and an SCell dormancy indication, the value of the T-DAI indicates an accumulative number of DCIs for scheduling the PDSCH reception, up to a current PDCCH monitoring occasion on all serving cells.

In other words, T-DAI is redefined in this disclosure, i.e., T-DAI is determined by accumulating the number of DCIs.

According to the present disclosure, the C-DAI and the T-DAI are redefined, compared with the scheme of determining the C-DAI and the T-DAI by accumulating the number of PDSCH receptions, the C-DAI and the T-DAI are determined by accumulating the number of DCIs for scheduling the PDSCH reception, for a scenario where one DCI schedules PDSCHs on two carriers, PDSCHs on the two carriers can share the C-DAI indication field and the T-DAI indication field, which reduces DCI overhead. At the same time, in a case where both the C-DAI and T-DAI are 2 bits (maximum value is 4), due to the influence of DAI counting in cycles, the method of accumulating the number of PDSCH receptions can deal with the problem of missing detection of at most one consecutive second DCI format, but the scheme of accumulating the number of DCIs for scheduling PDSCH receptions can deal with the problem of missing detection of at most three consecutive second DCI formats, which can effectively improve the reliability of communication.

FIG. 4 is an example of determining C-DAI and T-DAI by accumulating the number of PDSCH receptions according to an embodiment of the present disclosure.

As shown in FIG. 4, it is assumed that the terminal device is configured with two carriers (carrier 1 and carrier 2), on which the CBG-based transmission is not configured and a maximum of 1 code word is supported. The first DCI format is denoted as DCI format a, and the second DCI format is denoted as DCI format b. Each of the DCI format a and DCI format b contains 2-bit C-DAI and 2-bit T-DAI (i.e., each of the C-DAI and T-DAI has a maximum value of 4 and counts in cycles). It is assumed that the base station sends a DCI format b at each of the PDCCH monitoring occasion 1 to PDCCH monitoring occasion 3. If the C-DAI and T-DAI are determined by accumulating the number of the PDSCH receptions, then C-DAI=2 and T-DAI=2 for the DCI format b at the PDCCH monitoring occasion 1; C-DAI=4, T-DAI=4 for the DCI format b at the PDCCH monitoring occasion 2; and C-DAI=2, T-DAI=2 for the DCI format b at the PDCCH monitoring occasion 1. Based on this, when the missing detection occurs on each of the DCI format b at the PDCCH monitoring occasion 1 and the DCI format b at the PDCCH monitoring occasion 2, the terminal device receives the DCI format b at the PDCCH monitoring occasion 3, and cannot determine that the missing detection occurs on the previous two DCI formats b, that is, the terminal device constructs 2-bit HARQ-ACK information.

FIG. 5 is an example of determining C-DAI and T-DAI by accumulating the number of DCIs for scheduling the PDSCH reception according to an embodiment of the present disclosure.

As shown in FIG. 5 it is assumed that the terminal device is configured with two carriers (Carrier 1 and Carrier 2) on which the CBG-based transmission is not configured and a maximum of 1 code word is supported. The first DCI format is denoted as DCI format a, and the second DCI format is denoted as DCI format b. Each of the DCI format a and DCI format b contains 2-bit C-DAI and 2-bit T-DAI (i.e., each of the C-DAI and T-DAI has a maximum value of 4 and counts in cycles). It is assumed that the base station sends a DCI format b at each of the PDCCH monitoring occasion 1 to PDCCH monitoring occasion 3. If the C-DAI and T-DAI are determined by accumulating the number of DCIs for scheduling the PDSCH reception, then C-DAI=1 and T-DAI=1 for DCI format b at the PDCCH monitoring occasion 1; C-DAI=2, T-DAI=2 for DCI format b at the PDCCH monitoring occasion 2; and C-DAI=3, T-DAI=3 for DCI format b at the PDCCH monitoring occasion 1. Based on this, when the missing detection occurs on each of the DCI format b at the PDCCH monitoring occasion 1 and the DCI format b at the PDCCH monitoring occasion 2, the terminal device receives the DCI format b at the PDCCH monitoring occasion 3, and can determine that the missing detection occurs on the previous two DCI formats b, that is, the terminal device constructs 6-bit (3*2 bit) HARQ-ACK information.

With reference to the comparison between FIG. 4 and FIG. 5, the base station actually sends three DCI formats b respectively at the PDCCH monitoring occasion 1 to the PDCCH monitoring occasion 3, and each DCI format b schedules two PDSCHs, i.e., the base station expects the terminal device to feedback 6-bit HARQ-ACK. If the C-DAI and T-DAI are determined by accumulating the number of PDSCH receptions, the base station and the terminal device will have an inconsistent understanding of payload size of HARQ-ACK. However, if the C-DAI and T-DAI are determined by accumulating the number of DCIs for scheduling the PDSCH reception, the base station and the terminal device will have a consistent understanding of payload size of HARQ-ACK, which improves reliability.

In some embodiments, the PDSCH receptions scheduled in the first DCI format or the second DCI format may include TB-based PDSCH receptions.

In some embodiments, the operation S220 may include the following operation.

A first HARQ-ACK sub-codebook or first HARQ-ACK information is determined or generated, where the first HARQ-ACK sub-codebook or the first HARQ-ACK information includes at least one of: a HARQ-ACK bit corresponding to a PDSCH reception scheduled by the first DCI format, a HARQ-ACK bit corresponding to the SPS PDSCH release scheduled by the first DCI format, or a HARQ-ACK bit corresponding to the SCell dormancy scheduled by the first DCI format, and the target HARQ-ACK codebook includes the first HARQ-ACK sub-codebook or the first HARQ-ACK information. Optionally, the first HARQ-ACK sub-codebook or the first HARQ-ACK information includes at least one of: a HARQ-ACK bit corresponding to a PDSCH reception scheduled by the first DCI format, a HARQ-ACK bit corresponding to the SPS PDSCH release indicated by the first DCI format, a HARQ-ACK bit corresponding to SPS PDSCH reception scheduled by the first DCI format or a HARQ-ACK bit corresponding to the SCell dormancy indicated by the first DCI format.

Optionally, if the at least one DCI is in the first DCI format, the target HARQ-ACK codebook only includes the first HARQ-ACK sub-codebook or the first HARQ-ACK information.

Optionally, the first HARQ-ACK sub-codebook or the first HARQ-ACK information is suitable for scenarios where a CBG-based PDSCH reception is not supported.

In some implementations, if the terminal device is not configured with first parameter and is configured with a second parameter having a value of 2, a 2-bit HARQ-ACK is determined or generated for the PDSCH reception, the SPS PDSCH release or the SCell dormancy scheduled by each of the first DCI formats; otherwise, a 1-bit HARQ-ACK is determined or generated. The first parameter enables HARQ-ACK spatial bundling, and the second parameter indicates the maximum number of code words that a DCI can schedule. For example, if the terminal device is not configured with first parameter and second parameter, a 1-bit HARQ-ACK is determined or generated for the PDSCH reception, the SPS PDSCH release or the SCell dormancy scheduled by each of the first DCI formats. The second parameter may be a maximum number of code words (maxNrofCodeWordsScheduledByDCI) scheduled based on the DCI.

In other words, for a carrier for receiving the first DCI format, if the terminal device is not configured with the first parameter and is configured with the second parameter having a value of 2, then the 2-bit HARQ-ACK is determined or generated for the PDSCH reception, the SPS PDSCH release or the SCell dormancy scheduled by each of the first DCI formats; otherwise, a 1-bit HARQ-ACK is determined or generated. For example, for the carrier for receiving the first DCI format, if the terminal device is not configured with the first parameter and the second parameter, then a 1-bit HARQ-ACK is determined or generated for the PDSCH reception, the SPS PDSCH release or the SCell dormancy scheduled by each of the first DCI formats.

In some embodiments, the operation S220 may include the following operation.

A second HARQ-ACK sub-codebook or second HARQ-ACK information is determined or generated, where the second HARQ-ACK sub-codebook or the second HARQ-ACK information includes a HARQ-ACK bit corresponding to a PDSCH reception scheduled by the second DCI format, and the target HARQ-ACK codebook includes the second HARQ-ACK sub-codebook or the second HARQ-ACK information.

Optionally, the at least one DCI is in the second DCI format, and the target HARQ-ACK codebook only includes the first HARQ-ACK sub-codebook or the first HARQ-ACK information.

Optionally, the second HARQ-ACK sub-codebook or the second HARQ-ACK information is suitable for scenarios where CBG-based PDSCH reception is not supported.

In some implementations, if the terminal device is not configured with first parameter and is configured with a second parameter having a value of 2, a 2*M-bit HARQ-ACK is determined or generated for at least two PDSCHs scheduled by each of the second DCI formats; otherwise, M-bit HARQ-ACK is determined or generated. The first parameter enables a HARQ-ACK spatial bundling, and the second parameter indicates a maximum number of code words scheduled by a DCI, and a value of M is a number of the at least two PDSCHs. For example, if the terminal device is not configured with the first parameter and the second parameter, an M-bit HARQ-ACK is determined or generated for at least two PDSCHs scheduled by each of the second DCI formats. The second parameter may be a maximum number of code words (maxNrofCodeWordsScheduledByDCI) scheduled based on the DCI.

In other words, for a carrier for receiving the second DCI format, if the terminal device is not configured with the first parameter and is configured with the second parameter having a value of 2, then the 2*M-bit HARQ-ACK is determined or generated for at least two PDSCHs scheduled by each of the second DCI formats; otherwise, an M-bit HARQ-ACK is determined or generated. For example, for the carrier for receiving the second DCI format, if the terminal device is not configured with the first parameter and the second parameter, then the M-bit HARQ-ACK is determined or generated for at least two PDSCHs scheduled by each of the second DCI formats.

In some embodiments, the operation S220 may include the following operation.

A first HARQ-ACK sub-codebook or first HARQ-ACK information is determined or generated, where the first HARQ-ACK sub-codebook or the first HARQ-ACK information includes at least one of: a HARQ-ACK bit corresponding to a PDSCH reception scheduled by the first DCI format, a HARQ-ACK bit corresponding to the SPS PDSCH release scheduled by the first DCI format or a HARQ-ACK bit corresponding to the SCell dormancy scheduled by the first DCI format; a second HARQ-ACK sub-codebook or second HARQ-ACK information is determined or generated, where the second HARQ-ACK sub-codebook or the second HARQ-ACK information includes a HARQ-ACK bit corresponding to a PDSCH reception scheduled by the second DCI format; and the second HARQ-ACK sub-codebook or the second HARQ-ACK information is appended behind the first HARQ-ACK sub-codebook or the first HARQ-ACK information to form the target HARQ-ACK codebook, or, the first HARQ-ACK sub-codebook or the first HARQ-ACK information is appended behind the second HARQ-ACK sub-codebook or the second HARQ- ACK information to form the target HARQ-ACK codebook.

Optionally, the first HARQ-ACK sub-codebook or the first HARQ-ACK information includes at least one of: a HARQ-ACK bit corresponding to a PDSCH reception scheduled by the first DCI format, a HARQ-ACK bit corresponding to the SPS PDSCH release indicated by the first DCI format, a HARQ-ACK bit corresponding to the SPS PDSCH reception scheduled by the first DCI format or a HARQ-ACK bit corresponding to the SCell dormancy indicated by the first DCI format.

Optionally, the at least one DCI includes the first DCI format and the second DCI format.

Optionally, the first HARQ-ACK sub-codebook or the first HARQ-ACK information is suitable for scenarios that the CBG-based PDSCH reception is not supported.

Optionally, the second HARQ-ACK sub-codebook or the second HARQ-ACK information is suitable for scenarios where the CBG-based PDSCH reception is not supported.

In some implementations, for the first HARQ-ACK sub-codebook or the first HARQ-ACK information, if a terminal device is not configured with first parameter and is configured with the second parameter having a value of 2, a 2-bit HARQ-ACK is determined or generated for the PDSCH reception, the SPS PDSCH release or the SCell dormancy scheduled by each of the first DCI formats; otherwise, a 1-bit HARQ-ACK is determined or generated, where the first parameter enables a HARQ-ACK spatial bundling, and the second parameter indicates a maximum number of code words scheduled by a DCI. For example, if the terminal device is not configured with the first parameter and the second parameter, a 1-bit HARQ-ACK is determined or generated for a PDSCH reception, the SPS PDSCH release or the SCell dormancy scheduled by each of the first DCI formats. The first parameter can also be indication information, for example, 1-bit information. Of course, in other alternative embodiments, the case where the terminal device is not configured with the first parameter can also be understood as the case where the terminal device is configured with a parameter indicating that the HARQ-ACK spatial bundling is not enabled. The second parameter may be a maximum number of code words (maxNrofCodeWordsScheduledByDCI) scheduled based on DCI.

In other words, for a carrier for receiving the first DCI format, if the terminal device is not configured with first parameter and is configured with the second parameter having a value of 2, then a 2-bit HARQ-ACK is determined or generated for a PDSCH reception, the SPS PDSCH release or the SCell dormancy scheduled by each of the first DCI formats; otherwise, a 1-bit HARQ-ACK is determined or generated. For example, for a carrier for receiving the first DCI format, if the terminal device is not configured with the first parameter and the second parameter, then a 1-bit HARQ-ACK is determined or generated for a PDSCH reception, the SPS PDSCH release or the SCell dormancy scheduled by each of the first DCI formats.

In some implementations, for the second HARQ-ACK sub-codebook or the second HARQ-ACK information, when a terminal device is not configured with a first parameter and is configured with a second parameter having a value of 2, a 2*M-bit HARQ-ACK is determined or generated for at least two PDSCHs scheduled by each of the second DCI formats; otherwise, M-bit HARQ-ACK is determined or generated, where the first parameter enables a HARQ-ACK spatial bundling, the second parameter indicates a maximum number of code words scheduled by a DCI, and a value of M is a number of the at least two PDSCHs. For example, if the terminal device is not configured with the first parameter and the second parameter, an M-bit HARQ-ACK is determined or generated for at least two PDSCHs scheduled by each of the second DCI formats. The second parameter may be a maximum number of code words (maxNrofCodeWordsScheduledByDCI) scheduled based on DCI.

In other words, for a carrier for receiving the second DCI format, the terminal device is not configured with the first parameter and is configured with the second parameter having a value of 2, a 2*M-bit HARQ-ACK is determined or generated for at least two PDSCHs scheduled by each of the second DCI formats; otherwise, an M-bit HARQ-ACK is determined or generated. For example, for a carrier for receiving the second DCI format, the terminal device is not configured with first parameter and the second parameter, an M-bit HARQ-ACK is determined or generated for at least two PDSCHs scheduled by each of the second DCI formats.

Taking a case where the at least one DCI includes a first DCI format and a second DCI format and the second DCI format schedules two PDSCHs as an example. In a process of constructing the first HARQ-ACK codebook, the first HARQ-ACK sub-codebook includes the HARQ-ACK bit corresponding to the PDSCH scheduled by the first DCI format, the HARQ-ACK bit corresponding to the SPS PDSCH release indicated by the first DCI format, the bit corresponding to the SPS PDSCH reception scheduled by the first DCI format and the bit corresponding to the SCell dormancy indicated by the first DCI format. The terminal device generates 1-bit HARQ-ACK information for each DAI (e.g., the C-DAI and/or T-DAI) if the terminal device is not configured with the first parameter and the second parameter on the carrier for receiving the first DCI format. The first parameter enables HARQ-ACK spatial binding, and the second parameter indicates a maximum number of code words scheduled by a DCI. In a process of constructing a second HARQ-ACK sub-codebook, the second HARQ-ACK sub-codebook includes the HARQ-ACK bits of PDSCHs scheduled by the second DCI format. The terminal device generates 2-bit HARQ-ACK information for each DAI (e.g., the C-DAI and/or T-DAI) if the terminal device is not configured with the first parameter and the second parameter on the carrier for receiving the second DCI format. Finally, the second HARQ-ACK sub-codebook is appended together with the first HARQ-ACK sub-codebook to form the HARQ-ACK codebook, and the HARQ-ACK codebook is sent on the PUCCH resource.

It should be noted that the specific values of the first parameter and the second parameter are not limited in the embodiments of the present disclosure. For example, in other alternative embodiments, the second parameter may have a value of 1, or the second parameter may also have a value greater than or equal to 2, such as, 3 or 4.

Furthermore, the sequence between the first HARQ-ACK sub-codebook and the second HARQ-ACK sub-codebook is not limited in the present disclosure, i.e., the second HARQ-ACK sub-codebook can be appended behind the first HARQ-ACK sub-codebook to form a HARQ-ACK codebook; or the first HARQ-ACK sub-codebook can also be appended behind the second HARQ-ACK sub-codebook to form the HARQ-ACK codebook.

In some embodiments, a C-DAI or a T-DAI included in each of the at least one DCI separately counts for the first HARQ-ACK sub-codebook and the second HARQ-ACK sub-codebook. Alternatively, a C-DAI or a T-DAI included in each of the at least one DCI separately counts for the first HARQ-ACK information and the second HARQ-ACK information.

When the target HARQ-ACK codebook includes both HARQ-ACK information corresponding to a PDSCH of one carrier scheduled by a DCI and HARQ-ACK information corresponding to PDSCHs of two carriers scheduled by a DCI, if a missing detection occurs on a certain DCI, the C-DAI or T-DAI included in each of the at least one DCI is constructed as: individually counting for the first HARQ-ACK sub-codebook and the second HARQ-ACK sub-codebook, or individually counting for the first HARQ-ACK information and the second HARQ-ACK information. Therefore, it can ensure that the terminal device will know whether the missed DCI schedules the PDSCH of one carrier or PDSCHs of two carriers, and also know that whether the corresponding position should contain 1-bit HARQ-ACK information or 2-bit HARQ-ACK information (it is assumed that the transmission of the PDSCH scheduled by the DCI is a TB-based transmission and only one code word can be scheduled), which can improve transmission reliability.

FIG. 6 and FIG. 7 are examples of unified counting for DAI (e.g., C-DAI or T-DAI) of the first HARQ-ACK sub-codebook and the second HARQ-ACK sub-codebook according to an embodiment of the present disclosure.

It is assumed that the terminal device is not configured with CBG-based transmission and that the terminal device supports a maximum of 1 code word. Each of the first DCI format and the second DCI format contain 2-bit DAI (e.g., 2-bit C-DAI and/or 2-bit T-DAI, i.e., the maximum value of both of the C-DAI and T-DAI is 4 and both the C-DAI and T-DAI counts in cycles). As shown in FIG. 6, it is assumed that the DCIs, sent from the base station, for scheduling PDSCH 1 to PDSCH 4, respectively, are all in the first DCI format, and if the DAI (e.g., C-DAI or T-DAI) of the first HARQ-ACK sub-codebook and the DAI (e.g., C-DAI or T-DAI) of the second HARQ-ACK sub-codebook are uniformly counted, then the DAIs of the DCIs respectively for scheduling PDSCH 1 to PDSCH 4 are 1, 2, 3 and 4. As shown in FIG. 7, it is assumed that the DCIs, sent from the base station, respectively for scheduling PDSCH 1, PDSCH 2 and PDSCH are all in the first DCI format and the DCIs for scheduling PDSCH 3 and PDSCH 4 are in the second DCI format. If the DAI (e.g., C-DAI or T-DAI) of the first HARQ-ACK sub-codebook and the DAI (e.g., C-DAI or T-DAI) of the second HARQ-ACK sub-codebook are uniformly counted, then the DAIs of the DCIs respectively for scheduling PDSCH 1 to PDSCH 5 are 1, 2, 3 and 4. Based on this, if a terminal device misses to detect a DCI with a DAI having a value of 3, the terminal device does not know whether the missed DCI schedules the PDSCH of one carrier or the PDSCHs of two carriers, and thus does not know whether the corresponding position should contain 1-bit HARQ-ACK information or 2-bit HARQ-ACK information.

In the present disclosure, the C-DAI or T-DAI included in each of the at least one DCI is constructed as: individually counting for the first HARQ-ACK sub-codebook and the second HARQ-ACK sub-codebook, or individually counting for the first HARQ-ACK information and the second HARQ-ACK information. Therefore, it can ensure that the terminal device will know whether the missed DCI schedules the PDSCH of one carrier or PDSCHs of two carriers, and also know whether the corresponding position should contain 1-bit HARQ-ACK information or 2-bit HARQ-ACK information (it is assumed that the transmission of the PDSCH scheduled by the DCI is a TB-based transmission and only one code word can be scheduled), which can improve the transmission reliability. In other words, the C-DAI or T-DAI included in each of the at least one DCI is constructed as: individually counting for the first HARQ-ACK sub-codebook and the second HARQ-ACK sub-codebook, or individually counting for the first HARQ-ACK information and the second HARQ-ACK information. The terminal device can distinguish the situations shown in FIG. 6 and FIG. 7 below, so that the base station and the terminal device have a consistent understanding of the payload size of target HARQ-ACK. That is to say, for the situation shown in FIG. 6, the terminal device misses to detect the DCI for scheduling one PDSCH, so the target HARQ-ACK codebook that the terminal device should construct needs to contain 4 bits; for the situation shown in FIG. 7, the terminal device misses to detect the DCI for scheduling two PDSCHs, so the target HARQ-ACK codebook that the terminal device should construct needs to contain 5 bits.

In some embodiments, the second DCI format schedules at least two PDSCHs, the at least two PDSCHs corresponds to at least two carriers respectively. In other words, the at least two PDSCHs corresponding to at least two carriers may correspond to one second DCI format.

In some embodiments, carrier sets configured for the terminal device includes a first carrier set, a second carrier set, and a third carrier set, any one of the first, second and third carrier sets may be an empty set or a non-empty set. The first DCI format corresponds to the first carrier set and/or the third carrier set, and the second DCI format corresponds to the second carrier set and/or the third carrier set. Optionally, the first HARQ-ACK codebook includes HARQ-ACK information of the PDSCH scheduled by the DCI corresponding to the first DCI format corresponding to the first carrier set and/or the third carrier set, and the second HARQ-ACK codebook includes HARQ-ACK information of the PDSCH scheduled by the DCI corresponding to the second DCI format corresponding to the second carrier set and/or the third carrier set.

In an implementation, for a carrier set among the first carrier set to the third carrier set, that is not configured with the first parameter and the second parameter, the HARQ-ACK information of a PDSCH scheduled by a DCI corresponding to the first DCI format is 1-bit information, the HARQ-ACK information of a PDSCH scheduled by a DCI corresponding to the second DCI format is M-bit information. The value of M is the number of at least two PDSCHs.

In an implementation, for a carrier set, among the first carrier set to the third carrier set, that is not configured with first parameter and is configured with the second parameter having a value of 2, then the HARQ-ACK information of a PDSCH scheduled by a DCI corresponding to the first DCI format is 2-bit information, and the HARQ-ACK information of a PDSCH scheduled by a DCI corresponding to the second DCI format is 2*M-bit information. The value of M is the number of at least two PDSCHs.

The scheme of the present disclosure will be described below in connection with a first embodiment.

First Embodiment

In this embodiment, it is assumed that the terminal device is configured with three carrier sets, i.e., a first carrier set to a third carrier set.

For the first carrier set, the terminal device is configured with only the first DCI format. For the second carrier set, the terminal device is configured with only the second DCI format. For the third carrier set, the terminal device is configured with both the first DCI format and the second DCI format. For either of the first carrier set to the third carrier set, the first parameter for enabling HARQ-ACK spatial bundling and the second parameter for indicating a maximum number of code words scheduled by a DCI are not configured.

Based on this, the terminal device generates a first HARQ-ACK sub-codebook for the PDSCH, SPS PDSCH release, SPS PDSCH reception or SCell dormancy indication, the PDSCH, the SPS PDSCH release or the SPS PDSCH reception is scheduled by the first DCI format in the first carrier set and the third carrier set, and the SCell dormancy is indicated by the first DCI format in the first carrier set and the third carrier set; and in the first HARQ-ACK sub-codebook, the terminal device generates 1-bit HARQ-ACK information for each DAI (e.g., the C-DAI and/or T-DAI). The terminal device generates a second HARQ-ACK sub-codebook for the PDSCH scheduled by the second DCI format in the second carrier set and the third carrier set; and in the second HARQ-ACK sub-codebook, the terminal device generates 2-bit HARQ-ACK information for each DAI (e.g., the C-DAI and/or T-DAI).

FIG. 8 is an example of a target HARQ-ACK codebook in a case where terminal device is not configured with the first parameter and the second parameter according to an embodiment of the present disclosure.

As shown in FIG. 8, it is assumed that the terminal device is configured with three carriers, namely carrier 1, carrier 2 and carrier 3. The carrier 1 belongs to the first carrier set, that is, the carrier 1 is only configured with the first DCI format; the carrier 3 belongs to the second carrier set, that is, the carrier 3 is only configured with the second DCI format; and carrier 2 belongs to a third carrier set, that is, the carrier 2 is configured with both the first DCI format and the second DCI format. The terminal device is not configured with the first parameter and the second parameter for carrier 1, carrier 2 and carrier 3.

As shown in FIG. 8, at least one DCI issued by the base station may include: a first DCI 1 to a first DCI 6 and a second DCI 1 to a second DCI 5.

The first DCI 1 to the first DCI 6 correspond to the first DCI format.

The second DCI 1 to the second DCI 5 correspond to the second DCI format.

The C-DAI or T-DAI included in each of the at least one DCI individually counts for the first HARQ-ACK sub-codebook and the second HARQ-ACK sub-codebook. For example, for the first HARQ-ACK sub-codebook, the C-DAIs or T-DAIs included in the first DCI 1 to the first DCI 6 are independently counted. For another example, for the second HARQ-ACK sub-codebook, the C-DAIs or T-DAIs included in the second DCI 1 to the second DCI 5 are independently counted. Based on this, the terminal device constructs a first HARQ-ACK sub-codebook on a first carrier set and a third carrier set (carrier 1 and carrier 2) including a first DCI format. The first HARQ-ACK sub-codebook includes 6 bits $\{b_1, b_2, b_3, b_4, b_5, b_6\}$ respectively corresponding to PDSCHs scheduled by the first DCI 1 to the first DCI 6. The terminal device constructs a second HARQ-ACK sub-codebook on a second carrier set and a third carrier set (carrier 3 and carrier 2) including a second DCI format. The second HARQ-ACK sub-codebook includes 5*2=10 bits $\{b_1, b_2, b_3, b_4, b_5, b_6, b_7, b_8, b_9, b_{10}\}$ respectively corresponding to PDSCHs scheduled by the second DCI 1 to the second DCI 5. The terminal device appends the second HARQ-ACK sub-codebook behind the first HARQ-ACK sub-codebook to obtain a total of 16-bit HARQ-ACK bits.

In some embodiments, the PDSCH receptions scheduled by the first DCI format or the second DCI format may include the TB-based PDSCH reception. For example, the PDSCH receptions scheduled by the first DCI format or the second DCI format may include the TB-based PDSCH reception and the CBG-based PDSCH reception.

In some embodiments, the operation S220 may include the following operations:

a third HARQ-ACK sub-codebook or third HARQ-ACK information is determined or generated, where the third HARQ-ACK sub-codebook or the third HARQ-ACK information includes at least one of: a HARQ-ACK bit corresponding to a first PDSCH reception scheduled by the first DCI format, a HARQ-ACK bit corresponding to the SPS PDSCH release scheduled by the first DCI format, or a HARQ-ACK bit corresponding to the SCell dormancy scheduled by the first DCI format, where the first PDSCH reception is a TB-based PDSCH reception; and/or a fourth HARQ-ACK sub-codebook or fourth HARQ-ACK information is determined or generated, where the fourth HARQ-ACK sub-codebook or the fourth HARQ-ACK information includes a HARQ-ACK bit corresponding to a second PDSCH reception scheduled by the first DCI format, and where the second PDSCH reception is a CBG-based PDSCH reception; and/or a fifth HARQ-ACK sub-codebook or a fifth HARQ-ACK information is determined or generated, where the fifth HARQ-ACK sub-codebook or the fifth HARQ-ACK information includes a HARQ-ACK bit corresponding to a third PDSCH reception scheduled by the second DCI format, and where the third PDSCH reception is a TB-based PDSCH reception; and/or a sixth HARQ-ACK sub-codebook or a sixth HARQ-ACK information is determined or generated, where the sixth HARQ-ACK sub-codebook or the sixth HARQ-ACK information includes a HARQ-ACK bit corresponding to a fourth PDSCH reception scheduled by the second DCI format, and where the fourth PDSCH reception is a CBG-based PDSCH reception.

The target HARQ-ACK codebook includes at least one of: the third HARQ-ACK sub-codebook, the fourth HARQ-ACK sub-codebook, the fifth HARQ-ACK sub-codebook or the sixth HARQ-ACK sub-codebook; or, the target HARQ-ACK codebook includes at least one of: the third HARQ-ACK information, the fourth HARQ-ACK information, the fifth HARQ-ACK information or the sixth HARQ-ACK information.

In some embodiments, the operation S220 may include the following operations:

a seventh HARQ-ACK sub-codebook or seventh HARQ-ACK information is determined or generated, where the seventh HARQ-ACK sub-codebook or seventh HARQ-ACK information includes the third HARQ-ACK sub-codebook or third HARQ-ACK information; the third HARQ-ACK sub-codebook or the third HARQ-ACK information includes at least one of: a HARQ-ACK bit corresponding to a first PDSCH reception scheduled by the first DCI format, a HARQ-ACK bit corresponding to the SPS PDSCH release scheduled by the first DCI format, or a HARQ-ACK bit corresponding to the SCell dormancy scheduled by the first DCI format, and the first PDSCH reception is the TB-based PDSCH reception; and/or, where the seventh HARQ-ACK sub-codebook includes the fourth HARQ-ACK sub-codebook or the fourth HARQ-ACK information, where the fourth HARQ-ACK sub-codebook or the fourth HARQ-ACK information includes a HARQ-ACK bit corresponding to a second PDSCH reception scheduled by the first DCI format, and the second PDSCH reception is a CBG-based PDSCH reception; and/or an eighth HARQ-ACK sub-codebook or eighth HARQ-ACK information is determined or generated, where the eighth HARQ-ACK sub-codebook or eighth HARQ-ACK information includes the fifth HARQ-ACK sub-codebook or fifth HARQ-ACK information. The fifth HARQ-ACK sub-codebook or the fifth HARQ-ACK information includes a HARQ-ACK bit corresponding to a third PDSCH reception scheduled by the second DCI format, and the third PDSCH reception is a TB-based PDSCH reception; and/or, where the eighth HARQ-ACK sub-codebook includes the sixth HARQ-ACK sub-codebook or the sixth HARQ-ACK information. The sixth HARQ-ACK sub-codebook or the sixth HARQ-ACK information includes a HARQ-ACK bit corresponding to a fourth PDSCH reception scheduled by the second DCI format, and the fourth PDSCH reception is a CBG-based PDSCH reception.

The target HARQ-ACK codebook includes at least one of: the seventh HARQ-ACK sub-codebook, or the eighth HARQ-ACK sub-codebook. Optionally, the target HARQ-ACK codebook includes at least one of the seventh HARQ-ACK information or the eighth HARQ-ACK information.

In short, a seventh HARQ-ACK sub-codebook or seventh HARQ-ACK information is generated for a PDSCH scheduled by the first DCI format, an SPS PDSCH release indicated by the first DCI format, or an SCell dormancy indicated by the first DCI format. The seventh HARQ-ACK sub-codebook or the seventh HARQ-ACK information includes two HARQ-ACK sub-codebooks, one of the two HARQ-ACK sub-codebooks is used for the TB-based reception and the other of the two HARQ-ACK sub-codebooks is used for the CBG-based reception. The eighth HARQ-ACK sub-codebook or the eighth HARQ-ACK information is generated for the PDSCH scheduled by the second DCI format. The eighth HARQ-ACK sub-codebook or the eighth HARQ-ACK information includes two HARQ-ACK sub-codebooks, one of the two HARQ-ACK sub-codebooks is used for the TB-based reception and the other of the two HARQ-ACK sub-codebooks is used for the CBG-based reception.

In some implementations, the operation S220 may include: the third HARQ-ACK sub-codebook or the third HARQ-ACK information is determined or generated for a first serving cell set; and/or, the fifth HARQ-ACK sub-codebook or the fifth HARQ-ACK information is determined or generated for a first serving cell set. The first serving cell set includes all downlink serving cells configured by the network device for a terminal device.

In some implementations, the operation S220 may include: the fourth HARQ-ACK sub-codebook or the fourth HARQ-ACK information is determined or generated for a second serving cell set; and/or, the sixth HARQ-ACK sub-codebook or the sixth HARQ-ACK information is determined or generated for a second serving cell set. The second serving cell set includes serving cells configured with CBG transmission parameters. As an example, each of the serving cells in the second serving cell set is configured with the CBG transmission parameters.

In some implementations, the target HARQ-ACK codebook is formed by arranging in arbitrary order at least one of the third HARQ-ACK sub-codebook, the fourth HARQ-ACK sub-codebook, the fifth HARQ-ACK sub-codebook or the sixth HARQ-ACK sub-codebook included in the target HARQ-ACK codebook. Optionally, the target HARQ-ACK codebook is formed by arranging in arbitrary order at least one of the third HARQ-ACK information, the fourth HARQ-ACK information, the fifth HARQ-ACK information or the sixth HARQ-ACK information included in the target HARQ-ACK codebook.

FIG. 9 and FIG. 10 are examples of an order of codebooks included in the target HARQ-ACK codebook according to an embodiment of the present disclosure.

As described in FIG. 9, the target HARQ-ACK codebook may include the third HARQ-ACK sub-codebook, the fourth HARQ-ACK sub-codebook, the fifth HARQ-ACK sub-codebook, and the sixth HARQ-ACK sub-codebook in sequence from front to back. As shown in FIG. 10, the target HARQ-ACK sub-codebook may include the third HARQ-ACK sub-codebook, the fifth HARQ-ACK sub-codebook, the fourth HARQ-ACK sub-codebook, and the sixth HARQ-ACK sub-codebook in sequence from front to back.

In some implementations, the C-DAI or T-DAI is individually counted for each of the at least one of the third HARQ-ACK sub-codebook, the fourth HARQ-ACK sub-codebook, the fifth HARQ-ACK sub-codebook or the sixth HARQ-ACK sub-codebook included in the target HARQ-ACK codebook; or C-DAI or the T-DAI is individually counted for each of the at least one of the third HARQ-ACK information, the fourth HARQ-ACK information, the fifth HARQ-ACK information, or the sixth HARQ-ACK information included in the target HARQ-ACK codebook.

In other words, for a first PDSCH reception for scheduling, the SPS PDSCH release, and the SCell dormancy, the C-DAI or T-DAI are individually counted. For a second PDSCH reception for scheduling, the C-DAI or T-DAI is individually counted. For the third PDSCH reception for scheduling, the C-DAI or T-DAI is individually counted. For the fourth PDSCH reception for scheduling, the C-DAI or T-DAI is individually counted.

As an example, for each of the at least one DCI, the C-DAI or T-DAI is individually counted for the third HARQ-ACK sub-codebook or the fourth HARQ-ACK sub-codebook, or, the C-DAI or T-DAI is individually counted for the fifth HARQ-ACK sub-codebook and/or the sixth HARQ-ACK sub-codebook. For another example, for each DCI of at least one DCI, the C-DAI or T-DAI is individually counted for the third HARQ-ACK information or the fourth HARQ-ACK information, or the C-DAI or T-DAI is individually counted for the fifth HARQ-ACK information and/or the sixth HARQ-ACK information.

In some embodiments, the second DCI format schedules at least two PDSCHs, the at least two PDSCHs correspond to at least two carriers. In other words, the at least two PDSCHs corresponding to at least two carriers may correspond to one second DCI format.

In some embodiments, carrier sets configured for the terminal device includes a first carrier set to a third carrier set, any one of the first carrier set to the third carrier set may be an empty set or a non-empty set. The first DCI format corresponds to the first carrier set and/or the third carrier set, and the second DCI format corresponds to the second carrier set and/or the third carrier set. Optionally, the first HARQ-ACK codebook includes HARQ-ACK information of the PDSCH scheduled by the DCI corresponding to the first DCI format corresponding to the first carrier set and/or the third carrier set, and the second HARQ-ACK codebook includes HARQ-ACK information of the PDSCH scheduled by the DCI corresponding to the second DCI format corresponding to at least one of the second carrier set or the third carrier set.

In an implementation, the first carrier set to the third carrier set are not configured with the first parameter and the second parameter, and the first carrier set to the third carrier set are not configured with a CBG transmission based carrier set, then the HARQ-ACK information of a PDSCH scheduled by the DCI corresponding to the first DCI format is 1-bit information, the HARQ-ACK information of a PDSCH scheduled by a DCI corresponding to the second DCI format is M-bit information. The value of M is the number of at least two PDSCHs.

In an implementation, the first carrier set to the third carrier set are not configured with the first parameter, the first carrier set to the third carrier set are configured with the second parameter having a value of 2, and the first carrier set to the third carrier set are not configured with a CBG transmission based carrier set, then the HARQ-ACK information of a PDSCH scheduled by the DCI corresponding to the first DCI format is 2-bit information, and the HARQ-ACK information of a PDSCH scheduled by a DCI corresponding to the second DCI format is 2*M-bit information. The value of M is the number of at least two PDSCHs.

In an implementation, the first carrier set to the third carrier set are not configured with the first parameter, the first carrier set to the third carrier set are configured with the second parameter having a value of 2, and the first carrier set to the third carrier set are configured with the CBG transmission based carrier set (for example, the maximum number of CBGs is N), then the HARQ-ACK information of a PDSCH scheduled by the DCI corresponding to the first DCI format is 2*N bit information, and the HARQ-ACK information of a PDSCH scheduled by the DCI corresponding to the second DCI format is 2*N*M bit information. The value of M is the number of at least two PDSCHs.

The scheme of the present disclosure will be described below in connection with a second embodiment.

Second Embodiment

In this embodiment, it is assumed that the terminal device is configured with three carrier sets, i.e., a first carrier set to a third carrier set.

For the first carrier set, the terminal device is configured with only the first DCI format. For the second carrier set, the terminal device is configured with only the second DCI format. For the third carrier set, the terminal device is configured with both the first DCI format and the second DCI format. Neither the first parameter nor the second parameter is configured for the first carrier set to the third carrier set, and CBG-based transmission (e.g., the maximum number of CBGs is 4) is configured for the first carrier set to a third carrier set.

Based on this, the terminal device determines or generates the third HARQ-ACK sub-codebook or the third HARQ-ACK information for the HARQ-ACK bit corresponding to the first PDSCH reception scheduled by the first DCI format in the first carrier set and the third carrier set, the HARQ-ACK bit corresponding to the SPS PDSCH release scheduled by the first DCI format in the first carrier set and the third carrier set, or HARQ-ACK bit corresponding to the SCell dormancy scheduled by the first DCI format in the first carrier set and the third carrier set. The first PDSCH reception is the TB-based PDSCH reception. In addition, the terminal device determines or generates a fourth HARQ-ACK sub-codebook or a fourth HARQ-ACK information for the HARQ-ACK bit corresponding to the second PDSCH reception scheduled by the first DCI format in the first carrier set and the third carrier set. The second PDSCH reception is CBG-based PDSCH reception. In addition, the terminal device determines or generates the fifth HARQ-ACK sub-codebook or the fifth HARQ-ACK information for the HARQ-ACK bit corresponding to the third PDSCH reception scheduled by the second DCI format in the first carrier set and the third carrier set. The third PDSCH reception is the TB-based PDSCH reception. In addition, the terminal device determines or generates the sixth HARQ-ACK sub-codebook or the sixth HARQ-ACK information for the HARQ-ACK bit corresponding to the fourth PDSCH reception scheduled by the second DCI format in the first carrier set and the third carrier set. The fourth PDSCH reception is the CBG-based PDSCH reception.

The C-DAI or T-DAI is individually counted for each of the at least one of the third HARQ-ACK sub-codebook, the fourth HARQ-ACK sub-codebook, the fifth HARQ-ACK sub-codebook or the sixth HARQ-ACK sub-codebook included in the target HARQ-ACK codebook. Alternatively, the C-DAI or the T-DAI is individually counted for each of the at least one of the third HARQ-ACK information, the fourth HARQ-ACK information, the fifth HARQ-ACK information, or the sixth HARQ-ACK information included in the target HARQ-ACK codebook.

FIG. 11 is an example of a target HARQ-ACK codebook in a case where the terminal device is configured with a first parameter of 4 and is not configured with the second parameter according to an embodiment of the present disclosure.

As shown in FIG. 11, it is assumed that the terminal device is configured with three carriers, namely, carrier 1, carrier 2 and carrier 3. The carrier 1 belongs to the first carrier set, that is, the carrier 1 is only configured with the first DCI format. The carrier 3 belongs to the second carrier set, that is, the carrier 3 is only configured with the second DCI format. The carrier 2 belongs to a third carrier set, i.e., the carrier 2 is configured with both the first DCI format and the second DCI format. The first parameter configured by the terminal device for carrier 1 and carrier 3 is 4, and no second parameter is configured for the first carrier set to the third carrier set. The first parameter enables the HARQ-ACK spatial bundling, and the second parameter indicates the maximum number of code words scheduled by the DCI.

As shown in FIG. 11, at least one DCI transmitted by the base station may include: a first DCI 1-1 to a first DCI 1-4, a first DCI 2-1 to a first DCI 2-2, a second DCI 3-1 to a second DCI 3-2 and a second DCI 4-1 to a second DCI 4-3.

The first DCI 1-1 to the first DCI 1-4 correspond to the first DCI format, and the transmission of the PDSCH scheduled by the first DCI format is the CBG-based transmission.

The first DCI 2-1 to the first DCI 2-2 correspond to the first DCI format, and the transmission of the PDSCH scheduled by the first DCI format is the TB-based transmission.

The second DCI 3-1 to the second DCI 3-2 correspond to the first DCI format, and the transmission of the PDSCH scheduled by the first DCI format is the TB-based transmission.

The second DCI 4-1 to the second DCI 4-3 correspond to the second DCI format and the transmission of the PDSCH scheduled by the second DCI format is the CBG-based transmission.

The C-DAI or T-DAI included in each of the at least one DCI are separately counted for the third HARQ-ACK sub-codebook, the fourth HARQ-ACK sub-codebook, the fifth HARQ-ACK sub-codebook and the sixth HARQ-ACK sub-codebook. For example, for the third HARQ-ACK sub-codebook, the C-DAI or T-DAI included in the first DCI 2-1 to the first DCI 2-2 are independently counted. For another example, for the fourth HARQ-ACK sub-codebook, C-DAI or T-DAI included in the first DCI 1-1 to the first DCI 1-4 are independently counted. For another example, for the fifth HARQ-ACK sub-codebook, the C-DAI or T-DAI included in the second DCI 3-1 to the second DCI 3-2 are independently counted. For another example, for the third HARQ-ACK sub-codebook, the C-DAI or T-DAI included in the second DCI 4-1 to the second DCI 4-3 are independently counted.

Based on this, the terminal device generates a third HARQ-ACK sub-codebook for TB-based transmission, SPS PDSCH release indication, SPS PDSCH reception indication or SCell dormancy indication, the TB-based transmission is scheduled by the first DCI format in the first carrier set and the third carrier set, the SPS PDSCH release, the SPS PDSCH reception and the SCell dormancy are indicated by the first DCI format in the first carrier set and the third carrier set. The third HARQ-ACK sub-codebook contains 2 bits, i.e., $\{b_1, b_2\}$. The terminal device generates a fourth HARQ-ACK sub-codebook for the CBG-based transmission scheduled by the first DCI format in the first carrier set and the third carrier set. The fourth HARQ-ACK sub-codebook contains 4*4=16 bits, i.e., $\{b_1, b_2, \ldots, b_{15}, b_{16}\}$. The terminal device generates a fifth HARQ-ACK sub-codebook for the TB-based transmission scheduled by the second DCI format in the second carrier set and the third carrier set. The fifth HARQ-ACK sub-codebook contains 2*2=4 bits, i.e., $\{b_1, b_2, b_3, b_4\}$. The terminal device generates a sixth HARQ-ACK sub-codebook for the CBG-based transmission scheduled by the second DCI format in the second carrier set and the third carrier set. The sixth HARQ-ACK sub-codebook contains 3*2*4=24 bits, i.e., $\{b_1, b_2, \ldots, b_{23}, b_{24}\}$. The terminal device appends the third HARQ-ACK sub-codebook to the sixth HARQ-ACK sub-codebook to generate a target HARQ-ACK codebook, i.e., the HARQ-ACK codebook contains 2+16+4+24=46 bits.

It should be noted that the order of the third HARQ-ACK sub-codebook to the sixth HARQ-ACK sub-codebook is not specifically limited in the present disclosure. In other words, the third HARQ-ACK sub-codebook to the sixth HARQ-ACK sub-codebook are arranged in an arbitrary order to form the target HARQ-ACK codebook.

In some embodiments, the method 300 may further include the following operation.

The target HARQ-ACK codebook is sent to the network device.

Preferred embodiments of the present disclosure have been described in detail with reference to the accompanying drawings, but the present disclosure is not limited to the specific details of the above embodiments. Within the scope of the technical conception of the present disclosure, various simple modifications can be made to the technical scheme of the present disclosure, and these simple modifications all fall within the scope of protection of the present disclosure. For example, each of the specific technical features described in the above specific embodiments may be combined in any suitable manner without contradiction, and various possible combinations are not further described in this disclosure in order to avoid unnecessary repetition. For another example, any combination may be made between the various embodiments of the present disclosure so long as it does not depart from the idea of the present disclosure and is also to be regarded as the disclosure of the present disclosure.

It should be understood that, in various embodiments of the present disclosure, the sequence numbers of the above processes do not imply the sequence of execution, and the sequence of execution of each process should be determined according to its functions and internal logic, and should not constitute any limitation on the implementation process of the embodiments of the present disclosure. Furthermore, in embodiments of the present disclosure, the terms "downlink" and "uplink" are used to represent the transmission direction of the signal or data, where the term "downlink" is used to represent a transmission direction of the signal or data as a first direction transmitted from a site to the user equipment of the cell, and the term "uplink" is used to represent a transmission direction of the signal or data as a second direction transmitted from the user equipment of the cell to the site. For example, a term "downlink signal" means that the transmission direction of the signal is a first direction. In addition, in embodiments of the present disclosure, the term "and/or" is only an association relationship describing associated objects and represents that three relationships may exist. For example, A and/or B may represent three conditions: i.e., independent existence of A, existence of both A and B and independent existence of B. In addition, the character "/" in the disclosure generally indicates that the relationship between the associated objects is "or".

The method for wireless communication according to the embodiment of the present disclosure has been described in detail from the perspective of a terminal device with reference to FIG. 3 to FIG. 11, the method for wireless communication according to the embodiments of the present disclosure will be described from the perspective of a network device with reference to FIG. 12 below.

FIG. 12 illustrates a schematic flowchart of a method 300 for wireless communication according to an embodiment of the present disclosure. The method 300 may be performed interactively by a terminal device and a network device. The terminal device shown in FIG. 12 may be the terminal device shown in FIG. 1 and the network device shown in FIG. 12 may be the access network device shown in FIG. 1.

As shown in FIG. 12, the method 300 may include operations S310 to S320.

In operation S310, at least one DCI is sent to the terminal device.

In operation S320, a target HARQ-ACK codebook is determined or generated, where the target HARQ-ACK codebook corresponds to a physical downlink shared channel (PDSCH) reception scheduled by the at least one DCI, a semi-persistent scheduling (SPS) PDSCH release indicated by the at least one DCI, or a secondary cell (SCell) dormancy indicated by the at least one DCI.

The at least one DCI includes at least one of a first DCI format for scheduling one PDSCH, or a second DCI format for scheduling at least two PDSCHs.

It should be understood that the operations in the method 300 may refer to the corresponding operations in the method 200 and will not be repeated herein for the sake of brevity. For example, the operation S320 in the method 300 may refer to the operation S220 in the method 200.

Embodiments of the method of the present disclosure are described in detail above with reference to FIG. 1 to FIG. 12 and embodiments of the device of the present disclosure are described in detail below with reference to FIG. 13 to FIG. 16.

Figure 13:
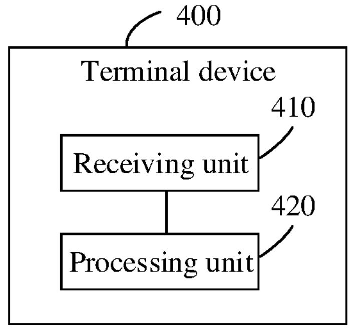
FIG. 13 is a schematic block diagram of a terminal device according to an embodiment of the present disclosure.

FIG. 13 is a schematic block diagram of a terminal device 500 according to an embodiment of the present disclosure.

As shown in FIG. 13, the terminal device 500 may include a receiving unit 410 and a processing unit 420.

The receiving unit 410 is configured to receive at least one DCI from a network device.

The processing unit 420 is configured to determine or generate a target HARQ-ACK codebook, where the target HARQ-ACK codebook corresponds to a PDSCH reception scheduled by the at least one DCI, an SPS PDSCH release indicated by the at least one DCI, or an SCell dormancy indicated by the at least one DCI.

The at least one DCI includes at least one of a first DCI format for scheduling one PDSCH, or a second DCI format for scheduling at least two PDSCHs.

In some embodiments, each of the at least one DCI includes a counter-downlink assignment index (C-DAI), and a value of the C-DAI indicates an accumulative number of DCIs for scheduling the PDSCH reception, indicating the SPS PDSCH release or indicating the SCell dormancy up to a current serving cell and a current PDCCH monitoring occasion.

In some embodiments, each of the at least one DCI includes a total-downlink assignment index (T-DAI), and a value of the T-DAI indicates an accumulative number of DCIs for scheduling the PDSCH reception, indicating the SPS PDSCH release or indicating the SCell dormancy, up to a current PDCCH monitoring occasion on all serving cells.

In some embodiments, the processing unit 420 is specifically configured to perform the following operation.

A first HARQ-ACK sub-codebook or first HARQ-ACK information is determined or generated, where the first HARQ-ACK sub-codebook or the first HARQ-ACK information includes at least one of: a HARQ-ACK bit corresponding to a PDSCH reception scheduled by the first DCI format, a HARQ-ACK bit corresponding to the SPS PDSCH release scheduled by the first DCI format, or a HARQ-ACK bit corresponding to the SCell dormancy scheduled by the first DCI format. The target HARQ-ACK codebook includes the first HARQ-ACK sub-codebook or the first HARQ-ACK information.

In some embodiments, the processing unit 420 is specifically configured to perform the following operation.

A second HARQ-ACK sub-codebook or second HARQ-ACK information is determined or generated, where the second HARQ-ACK sub-codebook or the second HARQ-ACK information includes a HARQ-ACK bit corresponding to a PDSCH reception scheduled by the second DCI format, and the target HARQ-ACK codebook includes the second HARQ-ACK sub-codebook or the second HARQ-ACK information.

In some embodiments, the processing unit 420 is specifically configured to perform the following operations.

A first HARQ-ACK sub-codebook or first HARQ-ACK information is determined or generated, where the first HARQ-ACK sub-codebook or the first HARQ-ACK information includes at least one of: a HARQ-ACK bit corresponding to a PDSCH reception scheduled by the first DCI format, a HARQ-ACK bit corresponding to the SPS PDSCH release scheduled by the first DCI format, or a HARQ-ACK bit corresponding to the SCell dormancy scheduled by the first DCI format.

A second HARQ-ACK sub-codebook or second HARQ-ACK information is determined or generated, where the second HARQ-ACK sub-codebook or the second HARQ-ACK information includes a HARQ-ACK bit corresponding to a PDSCH reception scheduled by the second DCI format.

The second HARQ-ACK sub-codebook or the second HARQ-ACK information is appended behind the first HARQ-ACK sub-codebook or the first HARQ-ACK information to form the target HARQ-ACK codebook. Optionally, the first HARQ-ACK sub-codebook or the first HARQ-ACK information is appended behind the second HARQ-ACK sub-codebook or the second HARQ-ACK information to form the target HARQ-ACK codebook.

In some embodiments, the processing unit 420 is specifically configured to perform the following operations.

When a terminal device is not configured with the first parameter and is configured with a second parameter having a value of 2, a 2-bit HARQ-ACK is determined or generated for a PDSCH reception, the SPS PDSCH release or the SCell dormancy scheduled by each of the first DCI formats; otherwise, a 1-bit HARQ-ACK is determined or generated.

The first parameter enables a HARQ-ACK spatial bundling, and the second parameter indicates a maximum number of code words scheduled by a DCI.

In some embodiments, the processing unit 420 is specifically configured to perform the following operation.

When a terminal device is not configured with a first parameter and is configured with a second parameter having a value of 2, a 2*M-bit HARQ-ACK is determined or generated for at least two PDSCHs scheduled by each of the second DCI formats; otherwise, M-bit HARQ-ACK is determined or generated.

The first parameter enables a HARQ-ACK spatial bundling, the second parameter indicates a maximum number of code words scheduled by a DCI, and a value of M is a number of the at least two PDSCHs.

In some embodiments, the processing unit 420 is specifically configured to:

- determine or generate a third HARQ-ACK sub-codebook or third HARQ-ACK information, where the third HARQ-ACK sub-codebook or the third HARQ-ACK information includes at least one of: a HARQ-ACK bit corresponding to a first PDSCH reception scheduled by the first DCI format, a HARQ-ACK bit corresponding to the SPS PDSCH release scheduled by the first DCI format, or a HARQ-ACK bit corresponding to the SCell dormancy scheduled by the first DCI format; the first PDSCH reception is a transport block (TB)-based PDSCH reception; and/or
- determine or generate a fourth HARQ-ACK sub-codebook or fourth HARQ-ACK information, where the fourth HARQ-ACK sub-codebook or the fourth HARQ-ACK information includes a HARQ-ACK bit corresponding to a second PDSCH reception scheduled by the first DCI format; the second PDSCH reception is a code block group (CBG)-based PDSCH reception; and/or
- determine or generate a fifth HARQ-ACK sub-codebook or a fifth HARQ-ACK information, where the fifth HARQ-ACK sub-codebook or the fifth HARQ-ACK information includes a HARQ-ACK bit corresponding to a third PDSCH reception scheduled by the second DCI format; the third PDSCH reception is a TB-based PDSCH reception; and/or
- determine or generate a sixth HARQ-ACK sub-codebook or a sixth HARQ-ACK information, where the sixth HARQ-ACK sub-codebook or the sixth HARQ-ACK information includes a HARQ-ACK bit corresponding to a fourth PDSCH reception scheduled by the second DCI format. The fourth PDSCH reception is a CBG-based PDSCH reception.

The target HARQ-ACK codebook includes at least one of: the third HARQ-ACK sub-codebook, the fourth HARQ-ACK sub-codebook, the fifth HARQ-ACK sub-codebook or the sixth HARQ-ACK sub-codebook, or, the target HARQ-ACK codebook includes at least one of: the third HARQ-ACK information, the fourth HARQ-ACK information, the fifth HARQ-ACK information or the sixth HARQ-ACK information.

In some embodiments, the processing unit 420 is specifically configured to determine or generate the third HARQ-ACK sub-codebook or the third HARQ-ACK information for a first serving cell set; and/or, the processing unit 420 is specifically configured to determine or generate the fifth HARQ-ACK sub-codebook or the fifth HARQ-ACK information for a first serving cell set. The first serving cell set includes all downlink serving cells configured by the network device for a terminal device.

In some embodiments, the processing unit 420 is specifically configured to determine or generate the fourth HARQ-ACK sub-codebook or the fourth HARQ-ACK information for a second serving cell set; and/or, the processing unit 420 is specifically configured to determine or generate the sixth HARQ-ACK sub-codebook or the sixth HARQ-ACK information for a second serving cell set. The second serving cell set includes serving cells configured with CBG transmission parameters.

In some embodiments, the processing unit 420 is specifically configured to form the target HARQ-ACK codebook by arranging in arbitrary order at least one of the third HARQ-ACK sub-codebook, the fourth HARQ-ACK sub-codebook, the fifth HARQ-ACK sub-codebook or the sixth HARQ-ACK sub-codebook included in the target HARQ-ACK codebook. Optionally, the processing unit 420 is specifically configured to form the target HARQ-ACK codebook by arranging in arbitrary order at least one of the third HARQ-ACK information, the fourth HARQ-ACK information, the fifth HARQ-ACK information or the sixth HARQ-ACK information included in the target HARQ-ACK codebook.

In some embodiments, C-DAI or T-DAI is individually counted for each of the at least one of the third HARQ-ACK sub-codebook, the fourth HARQ-ACK sub-codebook, the fifth HARQ-ACK sub-codebook or the sixth HARQ-ACK sub-codebook included in the target HARQ-ACK codebook.

Optionally, C-DAI or the T-DAI is individually counted for each of the at least one of the third HARQ-ACK information, the fourth HARQ-ACK information, the fifth HARQ-ACK information, or the sixth HARQ-ACK information included in the target HARQ-ACK codebook.

In some embodiments, the terminal device further includes a sending unit.

The sending unit is configured to send the target HARQ-ACK codebook to the network device.

It should be understood that device embodiments may correspond to method embodiments, and similar descriptions of the device embodiments may refer to the method embodiments. In particular, the terminal device 400 shown in FIG. 13 may correspond to a corresponding entity for performing the method 200 in the embodiments of the present disclosure, and the above and other operations and/or functions of all units in the terminal device 400 respectively implement the corresponding workflows of the methods illustrated in FIG. 3, which are not repeated herein for the sake of brevity.

Figure 14:
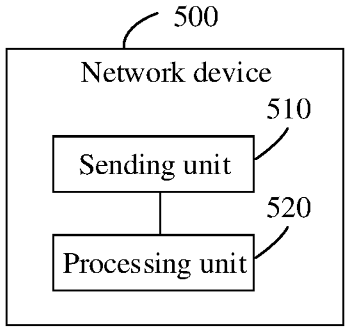
FIG. 14 is a schematic block diagram of a network device according to an embodiment of the present disclosure.

FIG. 14 is a schematic block diagram of a network device 500 according to an embodiment of the present disclosure.

As shown in FIG. 14, the network device 500 may include: a sending unit 510 and a processing unit 520.

The sending unit 510 is configured to send at least one DCI to a terminal device.

The processing unit 520 is configured to determine or generate a target HARQ-ACK codebook, where the target HARQ-ACK codebook corresponds to a PDSCH reception scheduled by the at least one DCI, an SPS PDSCH release indicated by the at least one DCI, or an SCell dormancy indicated by the at least one DCI.

The at least one DCI includes at least one of a first DCI format for scheduling one PDSCH, or a second DCI format for scheduling at least two PDSCHs.

In some embodiments, each of the at least one DCI includes a counter-downlink assignment index (C-DAI), and a value of the C-DAI indicates an accumulative number of DCIs for scheduling the PDSCH reception, indicating the SPS PDSCH release or indicating the SCell dormancy up to a current serving cell and a current PDCCH monitoring occasion.

In some embodiments, each of the at least one DCI includes a total-downlink assignment index (T-DAI), and a value of the T-DAI indicates an accumulative number of DCIs for scheduling the PDSCH reception, indicating the SPS PDSCH release or indicating the SCell dormancy, up to a current PDCCH monitoring occasion on all serving cells.

In some embodiments, the processing unit 520 is specifically configured to perform the following operations.

A first HARQ-ACK sub-codebook or first HARQ-ACK information is determine or generated, where the first HARQ-ACK sub-codebook or the first HARQ-ACK information includes at least one of: a HARQ-ACK bit corresponding to a PDSCH reception scheduled by the first DCI format, a HARQ-ACK bit corresponding to the SPS PDSCH release scheduled by the first DCI format, or a HARQ-ACK bit corresponding to the SCell dormancy scheduled by the first DCI format, and the target HARQ-ACK codebook includes the first HARQ-ACK sub-codebook or the first HARQ-ACK information.

In some embodiments, the processing unit 520 is specifically configured to perform the following operation.

A second HARQ-ACK sub-codebook or second HARQ-ACK information is determined or generated, where the second HARQ-ACK sub-codebook or the second HARQ-ACK information includes a HARQ-ACK bit corresponding to a PDSCH reception scheduled by the second DCI format. The target HARQ-ACK codebook includes the second HARQ-ACK sub-codebook or the second HARQ-ACK information.

In some embodiments, the processing unit 520 is specifically configured to perform the following operations.

A first HARQ-ACK sub-codebook or first HARQ-ACK information is determined or generated, where the first HARQ-ACK sub-codebook or the first HARQ-ACK information includes at least one of: a HARQ-ACK bit corresponding to a PDSCH reception scheduled by the first DCI format, a HARQ-ACK bit corresponding to the SPS PDSCH release scheduled by the first DCI format, or a HARQ-ACK bit corresponding to the SCell dormancy scheduled by the first DCI format.

A second HARQ-ACK sub-codebook or second HARQ-ACK information is determined or generated, where the second HARQ-ACK sub-codebook or the second HARQ-ACK information includes a HARQ-ACK bit corresponding to a PDSCH reception scheduled by the second DCI format.

The second HARQ-ACK sub-codebook or the second HARQ-ACK information is appended behind the first HARQ-ACK sub-codebook or the first HARQ-ACK information to form the target HARQ-ACK codebook, or, the first HARQ-ACK sub-codebook or the first HARQ-ACK information is appended behind the second HARQ-ACK sub-codebook or the second HARQ-ACK information to form the target HARQ-ACK codebook.

In some embodiments, the processing unit 520 is specifically configured to perform the following operations.

When a terminal device is not configured with a first parameter and is configured with a second parameter having a value of 2, a 2-bit HARQ-ACK is determined or generated for a PDSCH reception, the SPS PDSCH release or the SCell dormancy scheduled by each of the first DCI formats; otherwise, a 1-bit HARQ-ACK is determined or generated.

The first parameter enables a HARQ-ACK spatial bundling, and the second parameter indicates a maximum number of code words scheduled by a DCI.

In some embodiments, the processing unit 520 is specifically configured to perform the following operation.

When a terminal device is not configured with a first parameter and is configured with a second parameter having a value of 2, a 2*M-bit HARQ-ACK is determined or generated for at least two PDSCHs scheduled by each of the second DCI formats; otherwise, M-bit HARQ-ACK is determined or generated.

The first parameter enables a HARQ-ACK spatial bundling, the second parameter indicates a maximum number of code words scheduled by a DCI, and a value of M is a number of the at least two PDSCHs.

In some embodiments, the processing unit 520 is specifically configured to:

- determine or generate a third HARQ-ACK sub-codebook or third HARQ-ACK information, where the third HARQ-ACK sub-codebook or the third HARQ-ACK information includes at least one of: a HARQ-ACK bit corresponding to a first PDSCH reception scheduled by the first DCI format, a HARQ-ACK bit corresponding to the SPS PDSCH release scheduled by the first DCI format, or a HARQ-ACK bit corresponding to the SCell dormancy scheduled by the first DCI format; the first PDSCH reception is a transport block (TB)-based PDSCH reception; and/or
- determine or generate a fourth HARQ-ACK sub-codebook or fourth HARQ-ACK information, where the fourth HARQ-ACK sub-codebook or the fourth HARQ-ACK information includes a HARQ-ACK bit corresponding to a second PDSCH reception scheduled by the first DCI format, the second PDSCH reception is a code block group (CBG)-based PDSCH reception; and/or
- determine or generate a fifth HARQ-ACK sub-codebook or a fifth HARQ-ACK information, where the fifth HARQ-ACK sub-codebook or the fifth HARQ-ACK information includes a HARQ-ACK bit corresponding to a third PDSCH reception scheduled by the second DCI format, the third PDSCH reception is a TB-based PDSCH reception; and/or
- determine or generate a sixth HARQ-ACK sub-codebook or a sixth HARQ-ACK information, where the sixth HARQ-ACK sub-codebook or the sixth HARQ-ACK information includes a HARQ-ACK bit corresponding to a fourth PDSCH reception scheduled by the second DCI format; the fourth PDSCH reception is a CBG-based PDSCH reception.

The target HARQ-ACK codebook includes at least one of: the third HARQ-ACK sub-codebook, the fourth HARQ-ACK sub-codebook, the fifth HARQ-ACK sub-codebook or the sixth HARQ-ACK sub-codebook. Alternatively, the target HARQ-ACK codebook includes at least one of: the third HARQ-ACK information, the fourth HARQ-ACK information, the fifth HARQ-ACK information or the sixth HARQ-ACK information.

In some embodiments, the processing unit 520 is specifically configured to determine or generate the third HARQ-ACK sub-codebook or the third HARQ-ACK information for a first serving cell set; and/or, the processing unit 520 is specifically configured to determine or generate the fifth HARQ-ACK sub-codebook or the fifth HARQ-ACK information for a first serving cell set. The first serving cell set includes all downlink serving cells configured by the network device for a terminal device.

In some embodiments, the processing unit 520 is specifically configured to determine or generate the fourth HARQ-ACK sub-codebook or the fourth HARQ-ACK information for a second serving cell set; and/or, the processing unit 520 is specifically configured to determine or generate the sixth HARQ-ACK sub-codebook or the sixth HARQ-ACK information for a second serving cell set. The second serving cell set includes serving cells configured with CBG transmission parameters.

In some embodiments, the processing unit 520 is specifically configured to:

- form the target HARQ-ACK codebook by arranging in arbitrary order at least one of the third HARQ-ACK sub-codebook, the fourth HARQ-ACK sub-codebook, the fifth HARQ-ACK sub-codebook or the sixth HARQ-ACK sub-codebook included in the target HARQ-ACK codebook; or
- form the target HARQ-ACK codebook by arranging in arbitrary order at least one of the third HARQ-ACK information, the fourth HARQ-ACK information, the fifth HARQ-ACK information or the sixth HARQ-ACK information included in the target HARQ-ACK codebook.

In some embodiments, C-DAI or T-DAI is individually counted for each of the at least one of the third HARQ-ACK sub-codebook, the fourth HARQ-ACK sub-codebook, the fifth HARQ-ACK sub-codebook or the sixth HARQ-ACK sub-codebook included in the target HARQ-ACK codebook.

Optionally, C-DAI or the T-DAI is individually counted for each of the at least one of the third HARQ-ACK information, the fourth HARQ-ACK information, the fifth HARQ-ACK information, or the sixth HARQ-ACK information included in the target HARQ-ACK codebook.

In some embodiments, the network device 500 may further include a receiving unit.

The receiving unit is configured to receive the target HARQ-ACK codebook from the terminal device.

It should be understood that device embodiments may correspond to method embodiments, and similar descriptions of the device embodiments may refer to the method embodiments. In particular, the network device 500 shown in FIG. 14 may correspond to a corresponding entity for performing the method 300 in the embodiments of the present disclosure, and the above and other operations and/or functions of all units in the network device 500 respectively implement the corresponding workflows of the methods illustrated in FIG. 12.

The communication device of the embodiment of the present disclosure is described above from the perspective of functional modules with reference to the accompanying drawings. It should be understood that the functional modules may be implemented in hardware form, by instructions in software form, or by a combination of hardware and software modules. In particular, each operation of the method embodiments in the embodiments of the present disclosure can be implemented by the integrated logic circuit of the hardware in the processor and/or the instruction in software form, and the steps of the methods disclosed in connection with the embodiments of the present disclosure may be directly embodied as being performed by the hardware decoding processor, or may be performed with a combination of the hardware and software modules in the decoding processor. Optionally, the software module may be located in random memory, flash memory, read-only memory, programmable read-only memory or electrically erasable programmable memory, register and other mature storage media in the art. The storage medium is located in the memory, and the processor reads the information in the memory and completes the steps of the above method in combination with its hardware.

For example, the receiving unit 410 and the sending unit 510 referred to above may be implemented by a transceiver. The processing unit 420 and the processing unit 520 may be implemented by a processor.

Figure 15:
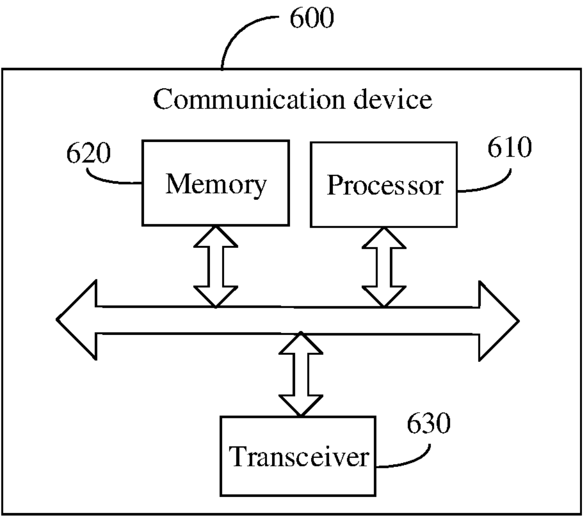
FIG. 15 is a schematic block diagram of a communication device according to an embodiment of the present disclosure.

FIG. 15 is a schematic structural diagram of a communication device 600 according to an embodiment of the present disclosure.

As shown in FIG. 15, the communication device 600 may include a processor 610.

The processor 610 may invoke and execute computer programs from a memory to implement the method in embodiments of the present disclosure.

As shown in FIG. 15, the communication device 600 may also include a memory 620.

The memory 620 may store indication information, and may also store codes, instructions and the like executed by the processor 610. The processor 610 may invoke and execute computer programs from the memory 620 to implement the method in embodiments of the present disclosure. The memory 620 may be a separate device independent of the processor 610 or may be integrated within the processor 610.

As shown in FIG. 15, the communication device 600 may also include a transceiver 630.

The processor 610 may control the transceiver 630 to communicate with other devices and in particular may send information or data to or receive information or data from other devices. The transceiver 630 may include a transmitter and a receiver. The transceiver 630 may further include antennas, and the number of antennas may be one or more.

It should be understood that the various components in the communication device 600 are connected by a bus system including a power bus, a control bus and a status signal bus, in addition to a data bus.

It should also be understood that the communication device 600 may be a terminal device in the embodiments of the present disclosure, and the communication device 600 may implement the corresponding processes implemented by the terminal device in the various methods of the embodiment of the present disclosure. That is to say, the communication device 600 of the embodiment of the present disclosure may correspond to the terminal device 400 in the embodiments of the present disclosure, and may correspond to the corresponding entity configured to perform the method 200 according to the embodiment of the present disclosure, which will not be repeated herein for the sake of brevity. Similarly, the communication device 600 may be a network device of the embodiments of the present disclosure, and the communication device 600 may implement corresponding processes implemented by the network device in various methods of the embodiments of the present disclosure. That is to say, the communication device 600 of the embodiments of the present disclosure may correspond to the network device 500 of the embodiments of the present disclosure, and may correspond to a corresponding entity configured to perform the method 300 according to the embodiments of the present disclosure, which will not be repeated here for the sake of brevity.

In addition, embodiments of the disclosure also provide a chip.

For example, the chip may be an integrated circuit chip having signal processing capability and can implement or perform the methods, operations and logic diagrams disclosed in embodiments of the present disclosure. The chip may also be referred to as a system level chip, a system chip, a chip system or an on-chip system chip, etc. Optionally, the chip may be applied to various communication devices such that a communication device mounted with the chip can perform the methods, operations and logic block diagrams disclosed in embodiments of the present disclosure.

Figure 16:
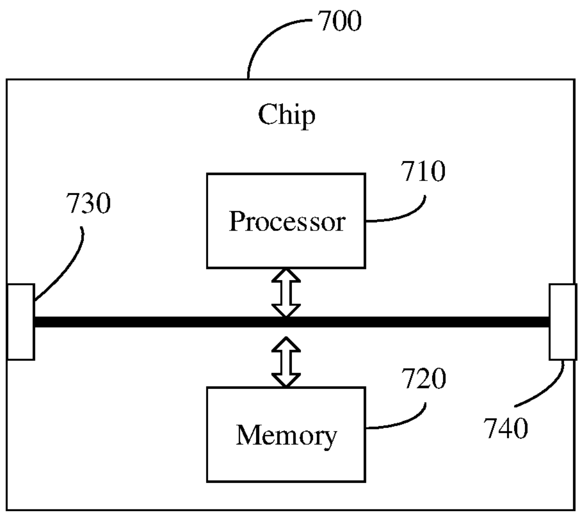
FIG. 16 is a schematic block diagram of a chip according to an embodiment of the present disclosure.

FIG. 16 is a schematic structural diagram of a chip 700 according to an embodiment of the present disclosure.

As shown in FIG. 16, the chip 700 includes a processor 710.

The processor 710 may invoke and execute computer programs from a memory to implement the method in embodiments of the present disclosure.

As shown in FIG. 16, the chip 700 may also include a memory 720.

The processor 710 may invoke and execute computer programs from the memory 720 to implement the method in embodiments of the present disclosure. The memory 720 may store indication information, and may also store codes, instructions and the like executed by the processor 710. The memory 720 may be a separate device independent of the processor 710 or may be integrated within the processor 710.

As shown in FIG. 16, the chip 700 may also include an input interface 730.

The processor 710 may control the input interface 730 to communicate with other devices or chips, and in particular may acquire information or data from other devices or chips.

As shown in FIG. 16, the chip 700 may also include an output interface 740.

The processor 710 may control the output interface 740 to communicate with other devices or chips, and in particular may output information or data to other devices or chips.

It should be understood that the chip 700 may be applied to the network device or the terminal device in the embodiments of the present disclosure, and the chip may implement the corresponding workflows implemented by the network device in the various methods of the embodiments of the present disclosure, and may also implement the corresponding workflows implemented by the terminal device in the various methods of the embodiments of the present disclosure, which will not be repeated herein for the sake of brevity.

It should also be understood that the various components in the chip 700 are connected by a bus system including a power bus, a control bus and a status signal bus, in addition to a data bus.

The processor referred to above may include, but are not limited to the following items.

A general purpose processor, a digital signal processor (DSP), an application specific integrated circuit (ASIC), a field programmable gate array (FPGA) or other programmable logic devices, discrete gate or transistor logic devices, discrete hardware components, and the like.

The processor may be configured to implement or perform the methods, operations, and logic diagrams disclosed in embodiments of the present disclosure. The operations of the methods disclosed in connection with the embodiments of the present disclosure may be directly embodied as being performed by the hardware decoding processor, or may be performed with a combination of the hardware and software modules in the decoding processor. The software module may be located in random memory, flash memory, read-only memory, programmable read-only memory or electrically erasable programmable memory, register and other storage media mature in the art. The storage medium is located in the memory, and the processor reads the information in the memory and completes the operations of the above method in combination with its hardware.

The memory referred to above includes, but is not limited to a volatile memory and/or a non-volatile memory.

The nonvolatile memory can be read-only memory (ROM), programmable ROM (PROM), erasable PROM (EPROM), electrically erasable EPROM (EEPROM) or flash memory. The volatile memory can be random access memory (RAM), which is used as an external cache. By way of illustration, but not limitation, many forms of RAM are available, such as static RAM (SRAM), dynamic RAM (DRAM), synchronous DRAM (SDRAM), double data rate SDRAM (DDR SDRAM, enhanced SDRAM (ESDRAM), synch link DRAM (SLDRAM) and direct Rambus RAM (DR RAM).

It is to be noted that the memory described herein is intended to include these and any other suitable types of memory.

The embodiments of the disclosure also provide a computer-readable storage medium configured to store computer programs. The computer-readable storage medium has stored thereon one or more programs including instructions that, when executed by a portable electronic device including multiple application programs, cause the portable electronic device to perform the method of the embodiments of method 200 or 300. Optionally, the computer-readable storage medium can be applied to the network device in the embodiments of the present disclosure, and the computer program causes the computer to perform the workflows implemented by the network device in the various methods of the embodiments of the present disclosure, which is not repeated herein for the sake of brevity. Optionally, the computer-readable storage medium can be applied to the mobile terminal or terminal device in the embodiments of the present disclosure, and the computer program causes the computer to perform processes implemented by the mobile terminal or terminal device in the various methods of the embodiments of the present disclosure, which will not be repeated herein for the sake of brevity.

The embodiments of the disclosure also provide a computer program product including computer programs. Optionally, the computer program product may be applied to the network device in the embodiments of the present disclosure, and the computer program causes the computer to perform the workflows implemented by the network device in the various methods of the embodiments of the present disclosure, which is not repeated herein for the sake of brevity. Optionally, the computer program product may be applied to the mobile terminal or terminal device in the embodiments of the present disclosure, and the computer program causes the computer to perform the workflows implemented by the mobile terminal or terminal device in the various methods of the embodiments of the present disclosure, which is not repeated herein for the sake of brevity.

The embodiments of the disclosure also provide a computer program. When the computer program is executed by the computer, the computer program causes the computer to perform the methods of the embodiments of method 200 or 300. Optionally, the computer program can be applied to the network device in the embodiments of the present disclosure, and when the computer program is executed on the computer, the computer program causes the computer to perform the workflows implemented by the network device in the various methods of the embodiments of the present disclosure, which is not repeated herein for the sake of brevity. Optionally, the computer program can be applied to the mobile terminal or terminal device in the embodiments of the present disclosure, and when the computer program is executed on the computer, the computer program causes the computer to perform the workflows implemented by the mobile terminal or terminal device in the various methods of the embodiments of the present disclosure, which will not be repeated herein for the sake of brevity.

The embodiments of the present disclosure also provide a communication system that may include the above-mentioned terminal devices and network devices to form the communication system 100 as shown in FIG. 1, which will not be repeated herein for the sake of brevity. It should be noted that the term "system" in this disclosure can also be referred to as "network management architecture" or "network system".

It should also be understood that the terminology used in the embodiments of the present disclosure and the appended claims is for the purpose of describing the particular embodiments only and is not intended to limit the present disclosure. As used in the disclosure and the appended claims, the singular forms "a", "said" and "the" are also intended to include the plural forms unless the context clearly indicates otherwise.

Those of ordinary skill in the art may realize that the unit and algorithm operations of each example described in combination with the embodiments disclosed herein can be realized by the combination of electronic hardware, or computer software and electronic hardware. Whether these functions are performed in hardware or software depends on the specific application and design constraints of the technical solution. A professional technician may use different methods to implement the described functions for each specific application, but such implementation is not considered to be beyond the scope of the present disclosure. If the function is implemented in the form of a software functional unit and sold or used as a stand-alone product, it may be stored in a computer-readable storage medium. Based on this understanding, the technical solution of the present disclosure, or part of the technical solution which essentially or contributes to the prior art, mat be embodied in the form of a software product, the computer software product is stored in a storage medium and includes several instructions causing a computer device (which can be a personal computer, a server, a network device, etc.) to perform all or part of the operations of the method according to each embodiment of the present disclosure. The aforementioned storage media include: USB disk, mobile hard disk, read-only memory (ROM), random access memory (RAM), floppy or optical disk and other media that can store program code.

Those skilled in the art may also understand that for the convenience and brevity of the description, the specific working process of the system, device and unit described above can be referred to the corresponding process in the embodiment of the method described above, and will not be described herein. In several embodiments provided by the present disclosure, it should be understood that the disclosed systems, devices and methods may be implemented in other ways. For example, in the embodiment of the device described above, the division of the units, modules or components is only a logical functional division, and there may be another division method in the actual implementation, for example, multiple units, modules or components may be combined or integrated into another system, or some units, modules or components may be ignored or not implemented. The unit, module or component described as a separation or display part may or may not be physically separated, that is, it may be located in one place, or it may be distributed to multiple network units. Some or all of the units, modules or components may be selected according to the actual requirements to achieve the purpose of the embodiments. Finally, the mutual coupling or direct coupling or communication connection illustrated or discussed above may be indirect coupling or communication connection through some interfaces, devices or units, and may be electrical, mechanical or other forms.

The above are only the specific embodiments of the disclosure, but the scope of protection of the disclosure is not limited thereto. Any person skilled in the art who can readily conceive of modifications or replacements within the technical scope of the disclosure shall be covered by the scope of protection of the disclosure. Therefore, the scope of protection of the disclosure shall be subject to the scope of protection of the claims.

The invention claimed is:

1. A method for wireless communication, comprising:

receiving at least one downlink control information (DCI) from a network device; and determining or generating a target hybrid automatic repeat request acknowledgement (HARQ-ACK) codebook, wherein the target HARQ-ACK codebook corresponds to a physical downlink shared channel (PDSCH) reception scheduled by the at least one DCI, a semi-persistent scheduling (SPS) PDSCH release indicated by the at least one DCI, or a secondary cell (SCell) dormancy indicated by the at least one DCI, wherein the target HARQ-ACK codebook comprises a first HARQ-ACK sub-codebook and a second HARQ-ACK sub-codebook, the first HARQ-ACK sub-codebook is suitable for scenarios where a code block group (CBG)-based PDSCH reception is not supported, and the second HARQ-ACK sub-codebook is suitable for the scenarios where the CBG-based PDSCH reception is not supported;

wherein the at least one DCI comprises a first DCI format for scheduling one PDSCH and a second DCI format for scheduling two PDSCHs; wherein the first HARQ-ACK sub-codebook comprises at least one of: a HARQ-ACK bit corresponding to a PDSCH reception scheduled by the first DCI format, a HARQ-ACK bit corresponding to an SPS PDSCH release indicated by the first DCI format, or a HARQ-ACK bit corresponding to an SCell dormancy indicated by the first DCI format, and the second HARQ-ACK sub-codebook comprises a HARQ-ACK bit corresponding to a PDSCH reception scheduled by the second DCI format; and wherein in a case that the first HARQ-ACK sub-codebook is suitable for the scenarios where the CBG-based PDSCH reception is not supported, and the second HARQ-ACK sub-codebook is suitable for the scenarios where the CBG-based PDSCH reception is not supported, determining or generating the target HARQ-ACK codebook comprises:

in response to a terminal device being not configured with a first parameter and being not configured with a second parameter, determining or generating a 1-bit HARQ-ACK for the PDSCH reception scheduled by the first DCI format, the SPS PDSCH release indicated by the first DCI format or the SCell dormancy indicated by the first DCI format; in response to the terminal device being not configured with the first parameter and being configured with the second parameter having a value of 2, determining or generating a 2-bit HARQ-ACK for the PDSCH reception scheduled by the first DCI format, the SPS PDSCH release indicated by the first DCI format or the SCell dormancy indicated by the first DCI formats; and in response to the terminal device being not configured with the first parameter and being not configured with the second parameter, determining or generating a 2-bit HARQ-ACK for the PDSCH reception scheduled by the second DCI format; in response to the terminal device being not configured with the first parameter and being configured with the second parameter having a value of 2, determining or generating a 4-bit HARQ-ACK for the PDSCH reception scheduled by the second DCI format;

wherein the first parameter is used for enabling an HARQ-ACK spatial bundling, and the second parameter is used for indicating a maximum number of code words scheduled by a DCI.

2. The method of claim 1, wherein each of the at least one DCI comprises a counter-downlink assignment index (C-DAI), and a value of the C-DAI indicates an accumulative number of DCIs for scheduling the PDSCH reception, indicating the SPS PDSCH release or indicating the SCell dormancy up to a current serving cell and a current PDCCH monitoring occasion.

3. The method of claim 1, wherein each of the at least one DCI comprises a total-downlink assignment index (T-DAI), and a value of the T-DAI indicates an accumulative number of DCIs for scheduling the PDSCH reception, indicating the SPS PDSCH release or indicating the SCell dormancy up to a current PDCCH monitoring occasion on all serving cells.

4. A terminal device, comprising a processor, a transceiver and a memory for storing computer-executable instructions, wherein the processor is configured to invoke and run the computer-executable instructions stored in the memory, to perform operations of:

receiving, through the transceiver, at least one downlink control information (DCI) from a network device; and determining or generating a target hybrid automatic repeat request acknowledgement (HARQ-ACK) codebook, wherein the target HARQ-ACK codebook corresponds to a physical downlink shared channel (PDSCH) reception scheduled by the at least one DCI, a semi-persistent scheduling (SPS) PDSCH release indicated by the at least one DCI, or a secondary cell (SCell) dormancy indicated by the at least one DCI, wherein the target HARQ-ACK codebook comprises a first HARQ-ACK sub-codebook and a second HARQ-ACK sub-codebook, the first HARQ-ACK sub-codebook is suitable for scenarios where a code block group (CBG-based) PDSCH reception is not supported, and the second HARQ-ACK sub-codebook is suitable for the scenarios where the CBG-based PDSCH reception is not supported;

wherein the at least one DCI comprises a first DCI format for scheduling one PDSCH and a second DCI format for scheduling two PDSCHs; wherein the first HARQ-ACK sub-codebook comprises at least one of: a HARQ-ACK bit corresponding to a PDSCH reception scheduled by the first DCI format, a HARQ-ACK bit corresponding to an SPS PDSCH release indicated by the first DCI format, or a HARQ-ACK bit corresponding to an SCell dormancy indicated by the first DCI format, and the second HARQ-ACK sub-codebook comprises a HARQ-ACK bit corresponding to a PDSCH reception scheduled by the second DCI format; and wherein in a case that the first HARQ-ACK sub-codebook is suitable for the scenarios where the CBG-based PDSCH reception is not supported, and the second HARQ-ACK sub-codebook is suitable for the scenarios where the CBG-based PDSCH reception is not supported, determining or generating the target HARQ-ACK codebook comprises:

in response to the terminal device being not configured with a first parameter and being not configured with a second parameter, determining or generating a 1-bit HARQ-ACK for the PDSCH reception scheduled by the first DCI format, the SPS PDSCH release indicated by the first DCI format or the SCell dormancy indicated by the first DCI format; in response to the terminal device being not configured with the first parameter and being configured with the second parameter having a value of 2, determining or generating a 2-bit HARQ-ACK for the PDSCH reception scheduled by the first DCI format, the SPS PDSCH release indicated by the first DCI format or the SCell dormancy indicated by the first DCI formats; and in response to the terminal device being not configured with the first parameter and being not configured with the second parameter, determining or generating a 2-bit HARQ-ACK for the PDSCH reception scheduled by the second DCI format; in response to the terminal device being not configured with the first parameter and being configured with the second parameter having a value of 2, determining or generating a 4-bit HARQ-ACK for the PDSCH reception scheduled by the second DCI format;

wherein the first parameter is used for enabling an HARQ-ACK spatial bundling, and the second parameter is used for indicating a maximum number of code words scheduled by a DCI.

5. The terminal device of claim 4, wherein determining or generating the target HARQ-ACK codebook comprises:

appending the second HARQ-ACK sub-codebook behind the first HARQ-ACK sub-codebook to form the target HARQ-ACK codebook, or, appending the first HARQ-ACK sub-codebook behind the second HARQ-ACK sub-codebook to form the target HARQ-ACK codebook.

6. The terminal device of claim 4, wherein the processor is configured to invoke and run the computer-executable instructions stored in the memory, to further perform an operation of:

sending, through the transceiver, the target HARQ-ACK codebook to the network device.

7. A network device, comprising a processor, a transceiver and a memory for storing computer-executable instructions, wherein the processor is configured to invoke and run the computer-executable instructions stored in the memory, to perform operations of:

sending, through the transceiver, at least one downlink control information (DCI) to a terminal device; and determining or generating a target hybrid automatic repeat request acknowledgement (HARQ-ACK) codebook, wherein the target HARQ-ACK codebook corresponds to a physical downlink shared channel (PDSCH) reception scheduled by the at least one DCI, a semi-persistent scheduling (SPS) PDSCH release indicated by the at least one DCI, or a secondary cell (SCell) dormancy indicated by the at least one DCI, wherein the target HARQ-ACK codebook comprises a first HARQ-ACK sub-codebook and a second HARQ-ACK sub-codebook, the first HARQ-ACK sub-codebook is suitable for scenarios where a code block group (CBG)-based PDSCH reception is not supported, and the second HARQ-ACK sub-codebook is suitable for the scenarios where the CBG-based PDSCH reception is not supported;

wherein the at least one DCI comprises a first DCI format for scheduling one PDSCH and a second DCI format for scheduling two PDSCHs; wherein the first HARQ-ACK sub-codebook comprises at least one of: a HARQ-ACK bit corresponding to a PDSCH reception scheduled by the first DCI format, a HARQ-ACK bit corresponding to an SPS PDSCH release indicated by the first DCI format, or a HARQ-ACK bit corresponding to an SCell dormancy indicated by the first DCI format, and the second HARQ-ACK sub-codebook comprises a HARQ-ACK bit corresponding to a PDSCH reception scheduled by the second DCI format; and wherein in a case that the first HARQ-ACK sub-codebook is suitable for the scenarios where the CBG-based PDSCH reception is not supported, and the second HARQ-ACK sub-codebook is suitable for the scenarios where the CBG-based PDSCH reception is not supported, determining or generating the target HARQ-ACK codebook comprises:

in response to the terminal device being not configured with a first parameter and being not configured with a second parameter, determining or generating a 1-bit HARQ-ACK for the PDSCH reception scheduled by the first DCI format, the SPS PDSCH release indicated by the first DCI format or the SCell dormancy indicated by the first DCI format; in response to the terminal device being not configured with the first parameter and being configured with the second parameter having a value of 2, determining or generating a 2-bit HARQ-ACK for the PDSCH reception scheduled by the first DCI format, the SPS PDSCH release indicated by the first DCI format or the SCell dormancy indicated by the first DCI formats; and in response to the terminal device being not configured with the first parameter and being not configured with the second parameter, determining or generating a 2-bit HARQ-ACK for the PDSCH reception scheduled by the second DCI format; in response to the terminal device being not configured with the first parameter and being configured with the second parameter having a value of 2, determining or generating a 4-bit HARQ-ACK for the PDSCH reception scheduled by the second DCI format;

wherein the first parameter is used for enabling an HARQ-ACK spatial bundling, and the second parameter is used for indicating a maximum number of code words scheduled by a DCI.

8. The network device of claim 7, wherein each of the at least one DCI comprises a counter-downlink assignment index (C-DAI), and a value of the C-DAI indicates an accumulative number of DCIs for scheduling the PDSCH reception, indicating the SPS PDSCH release or indicating the SCell dormancy up to a current serving cell and a current PDCCH monitoring occasion.

9. The network device of claim 7, wherein each of the at least one DCI comprises a total-downlink assignment index (T-DAI), and a value of the T-DAI indicates an accumulative number of DCIs for scheduling the PDSCH reception, indicating the SPS PDSCH release or indicating the SCell dormancy up to a current PDCCH monitoring occasion on all serving cells.

10. The network device of claim 7, wherein determining or generating the target HARQ-ACK codebook comprises:

appending the second HARQ-ACK sub-codebook behind the first HARQ-ACK sub-codebook to form the target HARQ-ACK codebook, or, appending the first HARQ-ACK sub-codebook behind the second HARQ-ACK sub-codebook to form the target HARQ-ACK codebook.

* * * * *